US008910270B2

(12) United States Patent
Nice et al.

(10) Patent No.: US 8,910,270 B2
(45) Date of Patent: Dec. 9, 2014

(54) REMOTE ACCESS TO PRIVATE NETWORK RESOURCES FROM OUTSIDE THE NETWORK

(75) Inventors: Nir Nice, Kfar Veradim (IL); Amit Finkelstein, Haifa (IL); Dror Kremer, Tel-Aviv (IL); Noam Ben-Yochanan, Petach Tikva (IL); Shyam Seshadri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 12/356,152

(22) Filed: Jan. 20, 2009

(65) Prior Publication Data

US 2010/0186079 A1 Jul. 22, 2010

(51) Int. Cl.
*H04L 29/06* (2006.01)
*G06F 17/30* (2006.01)
*H04L 29/12* (2006.01)

(52) U.S. Cl.
CPC ......... *H04L 63/0281* (2013.01); *H04L 61/3055* (2013.01); *H04L 63/164* (2013.01); *G06F 17/30861* (2013.01); *H04L 61/1511* (2013.01); *H04L 61/256* (2013.01)
USPC ................................ 726/14; 726/11; 709/245

(58) Field of Classification Search
USPC ................ 726/14, 11; 709/245, 203; 713/201
See application file for complete search history.

(56) References Cited

U.S. PATENT DOCUMENTS

| 6,317,838 | B1 | 11/2001 | Baize | |
|---|---|---|---|---|
| 6,421,732 | B1 * | 7/2002 | Alkhatib et al. | 709/245 |
| 6,430,623 | B1 * | 8/2002 | Alkhatib | 709/245 |
| 7,181,535 | B1 | 2/2007 | Remael | |
| 7,188,138 | B1 * | 3/2007 | Schneider | 709/203 |
| 7,228,350 | B2 | 6/2007 | Hong | |
| 2003/0154306 | A1 | 8/2003 | Perry | |

(Continued)

FOREIGN PATENT DOCUMENTS

JP 10-247946 A 9/1998
JP 2003-504898 A 2/2003

(Continued)

OTHER PUBLICATIONS

International Search Report and Written Opinion for International Application No. PCT/US2009/066892 mailed Jun. 17, 2010.

(Continued)

*Primary Examiner* — Jeffrey Pwu
*Assistant Examiner* — Thong Truong
(74) *Attorney, Agent, or Firm* — Henry Gabryjelski; Kate Drakos; Micky Minhas

(57) ABSTRACT

In some embodiments of the invention, techniques may make private identifiers for private network resources usable to establish connections to those private network resources from computing devices connected to an outside network. For example, when a computing device is connected to an outside network and attempting to contact a private network resource, DNS may be used to resolve a domain name for the private network resource to an IP address for an edge resource of the private network. Communications may be passed between the computing device and the edge resource according to protocols which embed the identifier originally used to identify the private network resource. The edge resource of the private network may analyze communications over the connection to determine this identifier, and use it to pass the communication to the desired private network resource.

15 Claims, 11 Drawing Sheets

(56) References Cited

U.S. PATENT DOCUMENTS

| | | | |
|---|---|---|---|
| 2003/0167403 A1* | 9/2003 | McCurley et al. | 713/201 |
| 2004/0125801 A1 | 7/2004 | Nawata | |
| 2005/0251856 A1 | 11/2005 | Araujo | |
| 2005/0262356 A1 | 11/2005 | Sandiford | |
| 2006/0031407 A1 | 2/2006 | Dispensa | |
| 2007/0168458 A1 | 7/2007 | Costa-Requena et al. | |
| 2007/0214232 A1 | 9/2007 | Belimpasakis | |
| 2008/0301794 A1 | 12/2008 | Lee | |

FOREIGN PATENT DOCUMENTS

| | | |
|---|---|---|
| JP | 2003-218951 A | 7/2003 |
| JP | 2004-120534 | 4/2004 |
| WO | 2005029877 A2 | 3/2005 |
| WO | WO 2007131873 A1 | 11/2007 |

OTHER PUBLICATIONS

Blue Coat, "Understanding Reverse-Proxy," http://www.bluecoat.com/support/self-service/1/reverse_proxy.html, retrieved Nov. 19, 2008 (1 page).
Isaserver, "Publishing Secure Outlook Web Access, POP3 and IMAP4 Services in an Exchange Front End/Back End Configuration," http://www.isaserver.org/img/upl/exchangekit/2003febepub/2003FEBEPub.htm, retrieved Nov. 19, 2008 (7 pages).
Microsoft, "ISA Server 2004 Executive Summary," Jul. 12, 2004, http://www.microsoft.com/middleeast/windowsserversystem/isaserver/evaluation/overview/default.aspx (99 pages).
Chinese Patent Application No. 200980155385.6, Office Action dated Jul. 3, 2013, 9 pages, including English translation.
Chinese Patent Application No. 2009801553856, Response to Office Action dated Oct. 25, 2013, 10 pages, including English translation of claims.
Japanese Patent Application No. 2011-547928, Notice of Rejection dated Sep. 6, 2013, 4 pages.
Japanese Patent Application No. 2011-547928, English Translation of Notice of Rejection dated Sep. 6, 2013, 2 pages.
Patent Abstracts of Japan, English translation of Abstract of JP 2003-218951, 1 page, Jul. 7, 2003.
Patent Abstracts of Japan, English translation of Abstract of JP 2004-120534, 1 pages, Apr. 15, 2004.
Japanese Patent Application No. 2011-547928, Amendment dated Dec. 6, 2013, 10 pages.
Japanese Patent Application No. 2011-547928, Final Decision of Rejection dated Jan. 8, 2014, 3 pages.
Japanese Patent Application No. 2011-547928, English translation of Final Decision of Rejection dated Jan. 8, 2014, 3 pages.
Patent Abstracts of Japan, Publication No. 10-247946, 1 page.
European Patent Application No. 09 839 824.1, Extended European Search Report, dated Mar. 25, 2013, 8 pages.
Imamura, K. et al., "A Proposal for a Remote Access Method Using GSCIP and IPsec", TENCON 2007, Oct. 20, 2007, pp. 1-4.
Chinese Patent Application No. 200980155385.6, Office Action dated Jul. 3, 2013, 9 pages (including English translation).
European Patent Application No. 09 839 824.1, Response to Extended European Search Report dated Aug. 8, 2013, 14 pages.
Australian Patent Application No. 2009339289, Patent Examination Report No. 1, dated Feb. 3, 2014, 4 pages.
European Patent Application No. 09 839 824.1, Amendment dated Aug. 11, 2014, 13 pages.
Japanese Patent Application No. 2011-547928, Amendment and Notice of Appeal dated May 7, 2014, 14 pages.
Chinese Patent Application No. 200980155385.6, Office Action dated Mar. 3, 2014, 9 pages (including English translation).
Chinese Patent Application No. 200980155385.6, Amendment dated May 19, 2014, 3 pages.
Chinese Patent Application No. 200980155385.6, Decision on Rejection dated Jun. 5, 2014, 8 pages (including English translation).
Australian Patent Application No. 2009339289, Response to Examiner's report, dated Mar. 12, 2014, 20 pages.
Australian Patent Application No. 2009339289, Notice of Acceptance dated Apr. 16, 2014, 3 pages.
European Patent Application No. 09 839 824.1, Communication dated Feb. 4, 2014, 4 pages.
Chinese Patent Application No. 200980155385.6, Request for Reexamination dated Sep. 22, 2014, 4 pages.

* cited by examiner

REMOTE ACCESS TO PRIVATE NETWORK RESOURCES FROM OUTSIDE THE NETWORK

BACKGROUND

There are different types of computer communication networks. Some are public networks to which many different users can gain access and communicate, or through which network traffic (e.g., data packets) may pass unimpeded. Other networks are private networks. In contrast to a public network, a private network may limit access to the network and limit communication to network resources connected to the private network. A private network may only permit authorized network traffic to pass through the network. Examples of private networks include home networks of computer users and corporate enterprise networks where only employees of the corporation may be permitted to access the private network. In some cases, a private network may be a portion of another network, such as where a portion of a corporate enterprise network is more secure than the enterprise network as a whole and has further limited access, thus making it a private network when compared to the rest of the corporate network.

Because of restricted access, network resources of a private network may not be freely accessible to computing devices outside the private network (e.g., to those connected to another network outside the private network, i.e., an "outside network"). In some such cases, the outside network may be communicatively connected to the private network, such that network traffic could flow if permitted, but the security settings of the private network may stop some network traffic from entering the private network.

In some circumstances, it is desirable to enable a computing device connected to an outside network to communicate to network resources of a private network. For example, an employee of a corporation, working from home or while traveling, may desire access to network resources of the corporation's enterprise network to perform a task related to his or her job.

Remote access technologies have been developed to provide access to a private network when connected to an outside network. One example of these remote access technologies is Virtual Private Networking (VPN). A computing device may be provided with a VPN client, into which a user of the computing device (e.g., an employee of a corporation) enters his or her credentials, such as a user name and password. The VPN client may then pass those credentials to a VPN gateway, which may then in turn authenticate those credentials to ensure the credentials are legitimate. Once authenticated, a secure connection (e.g., through a public network, such as the Internet) may be opened to the private network for the computing device running the VPN client, and the computing device may be allowed to access network resources connected to the private network while connected to an outside network. This secure connection may be formed using a "virtual" network interface, created on the computing device by the VPN client, that makes use of the hardware network interfaces/adapters of the computing device but that is assigned network characteristics (e.g., an IP address) by the private network. When using a VPN connection, a client may have full access to the private network and all network resources connected to it.

Another remote access technology is known as link translation. Link translation technology performs a translation of links or textual identifiers used by a private network resource. For example, a private network resource, such as a web server hosting an intranet web site available only to computing devices on the private network, may have the textual identifier "hrweb" identifying it as the host of the intranet web site for the Human Resources (HR) department. This identifier may be used to establish a connection to the web server, such as when it is input to a web browser. Inside the private network, the identifier ("hrweb") will be resolved to an IP address for the web server using the Domain Name System (DNS), and a connection will be established to the web server using that IP address.

This identifier, however, is not recognizable outside the private network, and cannot be resolved. Because the web server identified as "hrweb" is not accessible outside the private network, when a computing device connected to an outside network (e.g., an employee trying to access the HR department web site via the Internet while at home or traveling) attempts to connect to "hrweb" the user will experience an error. A link translation client on the computing device may therefore edit the link—which may include editing a document containing the link—to substitute for the internal private identifier a textual identifier for the network resource that is accessible to the outside network. For example, a gateway device that is connected to the private network and accessible via outside network may be identified to the outside network as "gateway.corporate.com." When a computing device not connected to the private network is using the private textual identifier, the link translation client, instead of using the original, private identifier ("hrweb"), may substitute the textual identifier for the gateway device and connect to the gateway device, and may separately pass the original, private identifier ("hrweb") to the gateway device. For example, when opening a connection for a web server using the HyperText Transfer Protocol (HTTP), when a user initially inputs "http://hrweb/" the link translation client may "translate" the link into "http://gateway.corporate.com/?originalURL="http://hrweb/". A connection may be established to the private network using the translated link, such as to a networking device of the private network acting as a reverse proxy. The reverse proxy may then again translate these translated links back to the original, private identifier, and establish a connection in the private network to the network resource identified by the original identifier. The reverse proxy may then pass messages between the computing device on the outside network and the network resource of the private network.

The substitution process of link translation is performed prior to any action being taken to open a connection to the private network. It is the substituted link, and the substituted identifier (e.g., "gateway.corporate.com") that is used to open the connection, and not the originally-input identifier "hrweb." Thus, when a Domain Name System (DNS) process is carried out to resolve a domain name into an IP address to be used to open a connection, the substituted identifier, "gateway.corporate.com," is resolved, and not the originally-input identifier.

In addition to the computing device opening the connection, a gateway device for a private network that uses link translation techniques may also translate links. For example, as a user of a computing device connected to an outside network requests information, such as web pages or documents, through the gateway device, the gateway device may scan all the information and perform a substitution on any private identifiers for private network resources. For example, if the intranet web site for the HR department includes a link to the intranet web site for the Accounting department (e.g., a link to "http://accountingweb/") the gateway device may substitute that link with a textual identifier that may be used on the outside network. For example, a link to "http://account-ingweb/" may be substituted with "http://gateway.corporate.com/?originalURL="http://accountingweb/").

SUMMARY

Applicants have recognized and appreciated that in some cases conventional remote access technologies do not provide a desired level of access, or a desired level of accuracy and error-free user experience. For example, VPN technologies provide full access to all network resources connected to a private network, while some network administrators may desire to limit access to the private network to only specific resources. Link translation technologies have other deficiencies, as they rely on being able to detect all private network identifiers in information passed to an outside computer and substitute outside network identifiers for them. A link translation client may not be aware of all private network resources, and as such may fail to perform substitutions for some identifiers, making those resources unavailable to a user connected via an outside network. Further, substitution performed on the identifiers embedded in documents (such as web pages) is a permanent edit on the documents, and so these documents may be broken when a user is again connected to the private network.

Applicants have developed new technologies to enable remote access to a private network by making private network identifiers usable on an outside network. Discussed herein are various principles for making private network identifiers resolvable and usable from outside the private network. For example, in some implementations, a private network identifier (e.g., a textual identifier like a domain name established using the Domain Name System (DNS)) for private network resources may be made resolvable using DNS on an outside network. For example, in one embodiment, when a computing device is connected to an outside network and attempting to contact a private network resource, DNS may be used to resolve a domain name for the private network resource to an Internet Protocol (IP) address for an edge resource of the private network. The edge resource of the private network, which may be a gateway device, may then enable communication between the computing device and the private network resource and pass communications back and forth between them. In some implementations, this connection to the edge resource rather than directly to the desired private network resource may be done seamlessly, without the knowledge of a user of the computing device opening the connection. This connection may also, in some implementations, be secured using any suitable security technologies, such as using the Internet Protocol Security (IPsec) protocol.

In some embodiments of the invention, upon receiving a connection from a computing device via an outside network, the edge resource of the private network (e.g., a gateway device) may analyze communications over the connection to determine the private network resource to which the computing device desires to communicate. Communications may be passed between the computing device and the edge resource according to one or more protocols which embed the identifier originally used to identify the private network resource (e.g., the identifier originally entered by a user) in the communication. This identifier may then be used by the edge resource to pass the communication to the desired private network resource.

In one embodiment there is provided a method for enabling remote access to a private network resource connected to a private network from a client computer outside of the private network, wherein the private network comprises an edge resource. The private network resource is associated with an identifier that is resolvable on the private network to an Internet Protocol (IP) address for the private network resource and that is resolvable outside of the private network to an IP address for the edge resource. The method comprises receiving, at the edge resource, a communication from the client computer, the communication including the identifier. The method further comprises resolving the identifier, on the private network, to the IP address of the private network resource and transmitting the communication to the private network resource.

In another embodiment there is provided at least one computer-readable storage medium encoded with computer-executable instructions that, when executed by a computer, cause the computer to perform a method for enabling remote access to a private network resource connected to a private network from a client computer outside of the private network. The private network comprises an edge resource. The private network resource is associated with a domain name that is resolvable on the private network to an Internet Protocol (IP) address for the private network resource and that is resolvable outside of the private network to an IP address for the edge resource. The method comprises receiving a Domain Name System (DNS) query from the client. The DNS query contains a domain name associated with the private network resource, and transmitting a response to the DNS query from the edge resource to the client containing an IP address for the edge resource. The method further comprises receiving, at the edge resource, a communication from the client computer, the communication including a header that contains the domain name associated with the private network resource, and transmitting the communication to the private network resource.

In a further embodiment there is provided an apparatus for use in a computer system comprising a private network having a private network resource and an edge resource accessible from outside the private network. The private network resource is associated with a domain name that is resolvable on the private network to an Internet Protocol (IP) address for the private network resource and resolvable outside the private network to an IP address for the edge resource. The apparatus comprises at least one processor programmed to determine an intended recipient within the private network of a communication received by the edge resource from a client outside the private network. The at least one processor is programmed to examine a header of the communications that contains an identifier for the intended recipient of the communication, resolve the identifier, on the private network, to an IP address of the intended recipient of the communication, and transmit the communication to the IP address of the intended recipient, the intended recipient being the private network resource.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
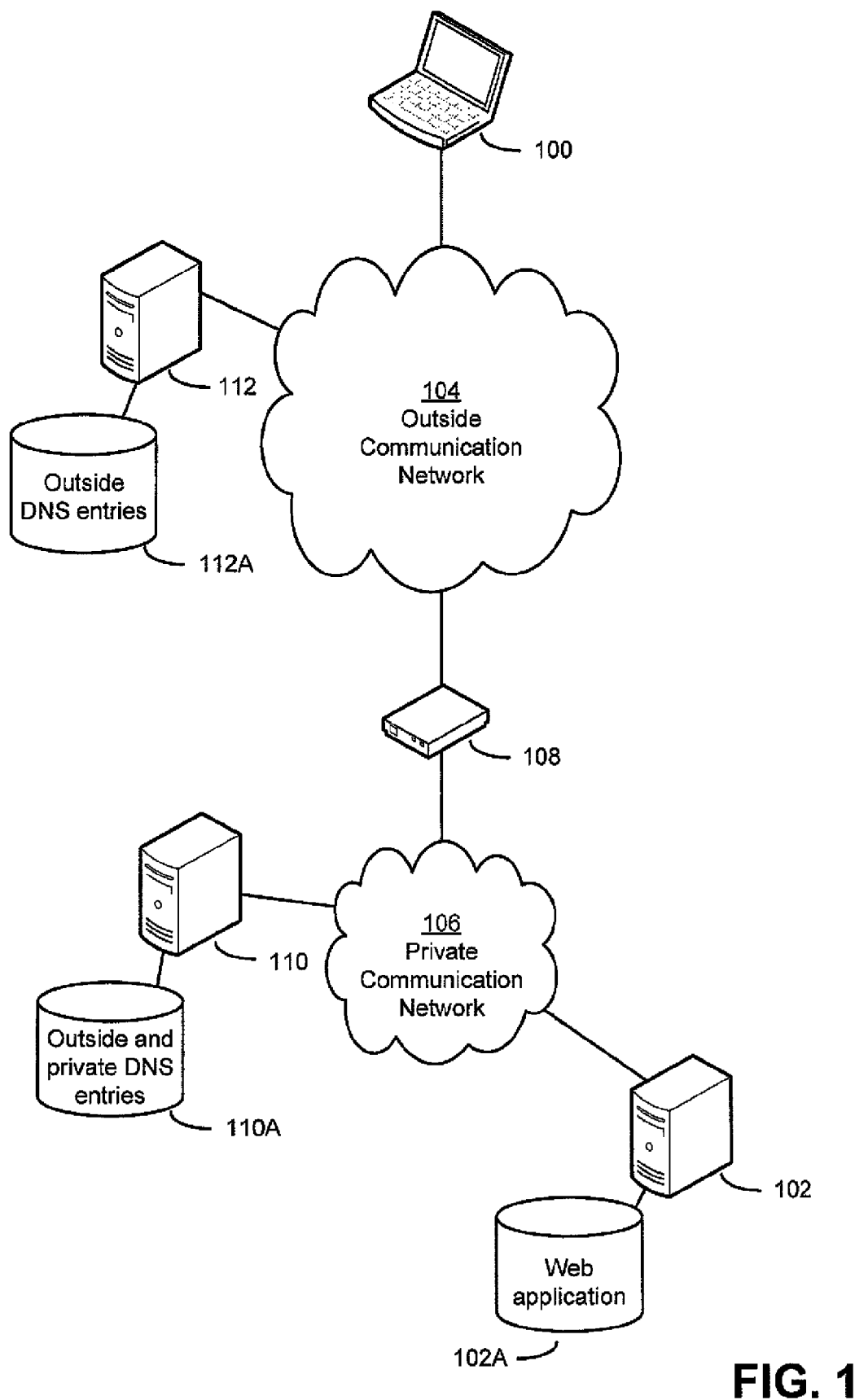
FIG. 1 is an illustration of an exemplary computer system in which some embodiments of the invention may act.

As mentioned above, existing remote access technologies (e.g., VPN and link translation) have some shortcomings. For example, when a computing device has opened a VPN connection to a private network, however, the computing device may have access to all network resources of the private network. (As used herein, a "network resource" may be any computing device connected to a network, including client computing devices, servers, networking devices such as routers and switches, and others.) An owner or administrator of the private network, however, may desire to limit exposure of the network to possible attacks by limiting access to private network resources when accessed remotely. For example, an administrator of a corporate network may determine that a file server storing up-to-date copies of files may need to be accessed remotely, from an outside network, but a backup server storing previous copies of those files may not need to be accessed remotely. Existing VPN technologies do not provide this capability, but instead give a remote user full access to all network resources to which that user would have if the user were connected to the private network directly. Further, in some implementations of VPN—known as "force tunnel" VPN—when a computing device has established a VPN connection to a private network, that computing device may be limited or prohibited from connecting to network resources other than those connected to the private network (e.g., a web server hosting a web site that is not associated with the private network). Applicants have appreciated that, in such cases, this limitation or prohibition may prevent a user from performing his/her job or other tasks, which may have a negative impact on the user experience.

As another example, when link translation is used to provide remote access to private network resources, when an identifier for a private network resource is detected, the private network identifier is substituted with an identifier that may be used on the outside network. However, link translation may not work or be desirable in all contexts. For example, for a link translation client to function properly and detect private identifiers for all private network resources, the link translation client must have the ability to view and process each type of file or document that may contain private identifiers. Different formats for text documents may impede this ability. Further, even if a link translation client could review content of all types of documents, the link translation client must have knowledge about all private network resources and private identifiers for them to be able to determine whether a particular identifier is a private identifier and whether it needs to be substituted. Furthermore, even if all link translation could be done properly, it may not be desirable in all contexts as link translation may make a permanent substitution in the files containing the private identifiers. If a computing device is reconnected to the private network directly, the file will still be edited, none of the substituted links will correctly identify private network resources, and that file will no longer be useful.

In accordance with one embodiment of the invention, a remote access technology is provided that allows private identifiers for private network resources to be themselves usable on outside networks to connect to the private network resources. Private identifiers for private network resources may identify the private network resource when a computing device seeking to use the identifier to access the private network resource is connected to the private network, but may identify an edge resource of the private network (e.g., a gateway device) when the computing device is connected to an outside network. In this way, the private identifier itself may be used to communicate with the private network resource.

The techniques described herein for making a private network identifier usable via an outside network may be applied to any suitable identifier for a network resource, and may be used to access any private network resource (e.g., any suitable computing device connected to a private network), as the techniques describes herein are not limited in this respect.

In some exemplary implementations described below, the Domain Name System (DNS) may be used to identify network resources using domain names. A domain name may be a suitable textual identifier, including any suitable alphanumeric identifier, for a network resource, such as "hrweb" for a web server hosting an intranet web site for the Human Resources (HR) department. In these implementations, when a computing device connected to the private network uses the domain name for the intranet web server to form a connection to it, the domain name "hrweb" may be resolved, using DNS, to an Internet Protocol (IP) address for the intranet web server itself. However, when the computing device uses the domain name "hrweb" when connected to an outside network, the domain name may be resolved, using DNS, to an IP address for an edge resource for the private network. An edge resource may be any suitable computing device that is connected to the private network but is directly accessible from outside the private network (e.g., a gateway device). In the examples below, the edge resource is referred to as a gateway device and/or a reverse proxy for ease of explanation, but any suitable edge device may be employed as embodiments of the invention are not limited in this respect.

When the domain name "hrweb" is resolved to an IP address of the gateway device, the computing device may communicate with the gateway device as if it were the intranet web server. For example, the computing device may open a connection to the gateway device, and exchange communications with the gateway device. Communications with the gateway device may be carried out in any suitable manner. In some implementations, such communications may be done according to a protocol that embeds in at least some of the communications an identifier used to identify the desired network resource. The identifier may be the original identifier that was resolved to the gateway or any other suitable identifier. In the case where identifier is a domain name (e.g., "hrweb") for a web server hosting an intranet web site, the identifier embedded in the communications may be the domain name (e.g., "hrweb"). The gateway device may then review the communications for this domain name and use it to identify the private network resource to which the communication is to be forwarded—in this case, the gateway device may use the domain name to identify that it should forward the communication to the intranet web server. The gateway may then forward the communication to the identified private network resource. If a response is received from the private network resource, the gateway may forward that response to the computing device that initiated the communication. For example, the gateway device may receive from a web browser on the client computer a request to download a web page, may forward the request to the web server, may receive the web page from the web server, and then forward the web page to the computing device that issued the request.

Techniques operating in accordance with principles described herein can be implemented in any suitable environment, including in any suitable computer system comprising any suitable number and type(s) of computing devices. FIG. 1 shows one illustrative computer system in which some exemplary implementations of the principles described herein may act, but it should be appreciated that embodiments of the invention are not limited to being implemented in this or any other particular type of computer system.

FIG. 1 shows a computer system including a private communication network 106 having a private network resource 102. The private network 106 may limit access to resources connected to it, including the private network resource 102, to only those devices connected to the private network 106. However, using techniques described herein, devices such as a computing device 100 that is outside of the private network 106 may communicate with the private network resource 102 via an outside communication network 104. While outside communication network 104 is shown as a single network, it should be appreciated that it could be any type of one or more networks, including the Internet and a direct connection to the edge resource 108 of private network 106.

Computing device 100 may be any suitable computing device for exchanging information over a communication network as the aspects of the invention are not limited in this respect. For example, as illustrated in FIG. 1, computing device 100 may be a laptop personal computer, but it should be appreciated that any suitable computing device may be used, including a desktop personal computer, personal digital assistant (PDA), smart phone, or other resource. In some implementations, the computing device 100 may be a mobile computing device that may be connected to the private network 106 at one time, then disconnected and brought to another location where it may be desired to connect to the private network 106 via the outside network 104 (which may be, for example, the Internet).

For example, the private network 106 may be an enterprise network of an organization such as a corporation, and the computing device 100 may be a laptop used by an employee of that corporation. The employee's laptop may at times be connected to the private network 106, such as when the employee is in the office, but at other times the laptop may be connected to the outside network 104, such as when the employee is at home or traveling.

As discussed above, private network resource 102 may be any suitable computing device connected to the private network 106. In some implementations, such as the one illustrated in FIG. 1 and discussed in various examples below, the private network resource 102 may be a web server 102. The web server 102 may be a host to a web-based application stored in a data store 102A of the web server, and may provide web pages of the web application to other computing devices for display in web browsers of those computing devices. For example, the web application may be a web application associated with an intranet web site of an HR department of a corporation associated with the private network 106. It should be appreciated, however, that embodiments of the invention are not limited to operating with private network resources that are web servers, as these techniques can be used to access any suitable computing device on the private network.

Computing device 100 is shown in FIG. 1 connected to an outside network 104, while web server 102 is shown connected to a private network 106. Outside network 104 and private network 106 each may be any suitable computer communication networks, and may include any suitable wired and/or wireless communication media. For example, the private network 106 may be a Local Area Network (LAN) implemented as a home network, or a LAN or Wide Area Network (WAN) implemented as a corporate enterprise network. Outside network 104 may be any network that is not the private network 106, including a publicly-accessible network such as the Internet.

As discussed above, in some implementations the private network 106 may be adapted to limit access to network resources connected to the private network 106—such as web server 102—to only other computing devices connected to private network 106. This may be done in any suitable manner, and may depend on how the edge resource 108 is implemented and what security techniques are used. Edge resource 108 may be implemented as any suitable device, including as a gateway, firewall, and/or a router.

In some implementations, the private network 106 may be adapted to limit access to the private network resources through security rules enforced at an edge resource 108. An edge resource 108 may be any computing device that is part of the private network 106 and provides an entry point into the private network (e.g., from the outside network 104). The edge resource 108 may regulate communications that may pass into and out of the private network 106. For example, the edge resource 108 may only permit authorized traffic to flow from outside network 104 into private network 106, and thus limit access to the private network 106 to only authorized parties.

In some embodiments discussed below, the edge resource 108 may be implemented as a reverse proxy 108 for the private network 106. As used herein, the term reverse proxy refers to any device that receives communications for one or more resources on the private network (which can be considered to be behind the reverse proxy) and determines to which resource a particular communication should be passed.

The computer system of FIG. 1 also includes two DNS servers 110 and 112. DNS server 110 is shown connected to the private network 106, and includes a data store 110A of outside and private DNS entries. These entries may be used to resolve identifiers for resources connected to both the private network 106 and outside network 104. DNS server 112 is connected to the outside network 104, and may include a data store 110A of outside DNS entries. These entries may be used to resolve identifiers for resources connected to the outside network 104 (e.g., resources available via a public network such as the Internet).

In DNS, when a user inputs to a computing device a domain name to initiate communication with a resource identified by that domain name, a DNS client on the computing device will query a DNS server to "resolve" the domain name into an IP address. This is done because humans find textual identifiers, including alphanumeric identifiers like domain names, easy to remember and use, but computers are adapted to use lengthy numeric identifiers like IP addresses to perform communication. A DNS server, upon receiving a query for a domain name from a DNS client on a computing device, will examine DNS entries for an IP address corresponding to the domain name in the query, either through information available to it locally or by querying the DNS entries of other DNS servers, and return the IP address to the DNS client. The computing device can then initiate communication with the resource using the IP address. The aspects of the invention described herein can be used in system that include DNS servers of any type.

Reverse proxy 108 may be used in some embodiments of the invention to enable communications between a device outside of the private network 106 (e.g., the computing device 100) and a resource of the private network 106 (e.g., the web server 102). In some such embodiments, a computing device 100 may use a domain name such as "hrweb" to identify web server 102. When that computing device 100 "resolves" the domain name while connected to the outside network 104, the domain name may be resolved to an IP address for the reverse proxy 108, to enable the computing device 100 to communicate with the web server 104 via the reverse proxy 108. This may be done in any suitable manner, examples of which are described below.

The examples described below include various techniques that may be used for enabling a computing device 100 to access the web server 102 from the outside network 104. For ease of discussion, examples given below of the techniques described herein are described with reference to the exemplary computer system of FIG. 1. It should be appreciated, however, that unless stated otherwise these techniques are not limited to operating in the exemplary computer system of FIG. 1. Techniques operating according to the principles described herein may be implemented in any suitable computer system.

To resolve a domain name into an IP address, a DNS client may be provisioned with an IP address for a DNS server to which the DNS client may send queries. In typical DNS implementations, when a computing device 100 connects to a network, the computing device 100 is provided with the address of a DNS server for that network. Thus, for example, when computing device 100 connects to outside network 104 it may be provided with the address of DNS server 112 in resolving domain names, and when computing device 100 connects to private network 106 it may be provided with the address of DNS server 110 for resolving domain names.

Figure 2:
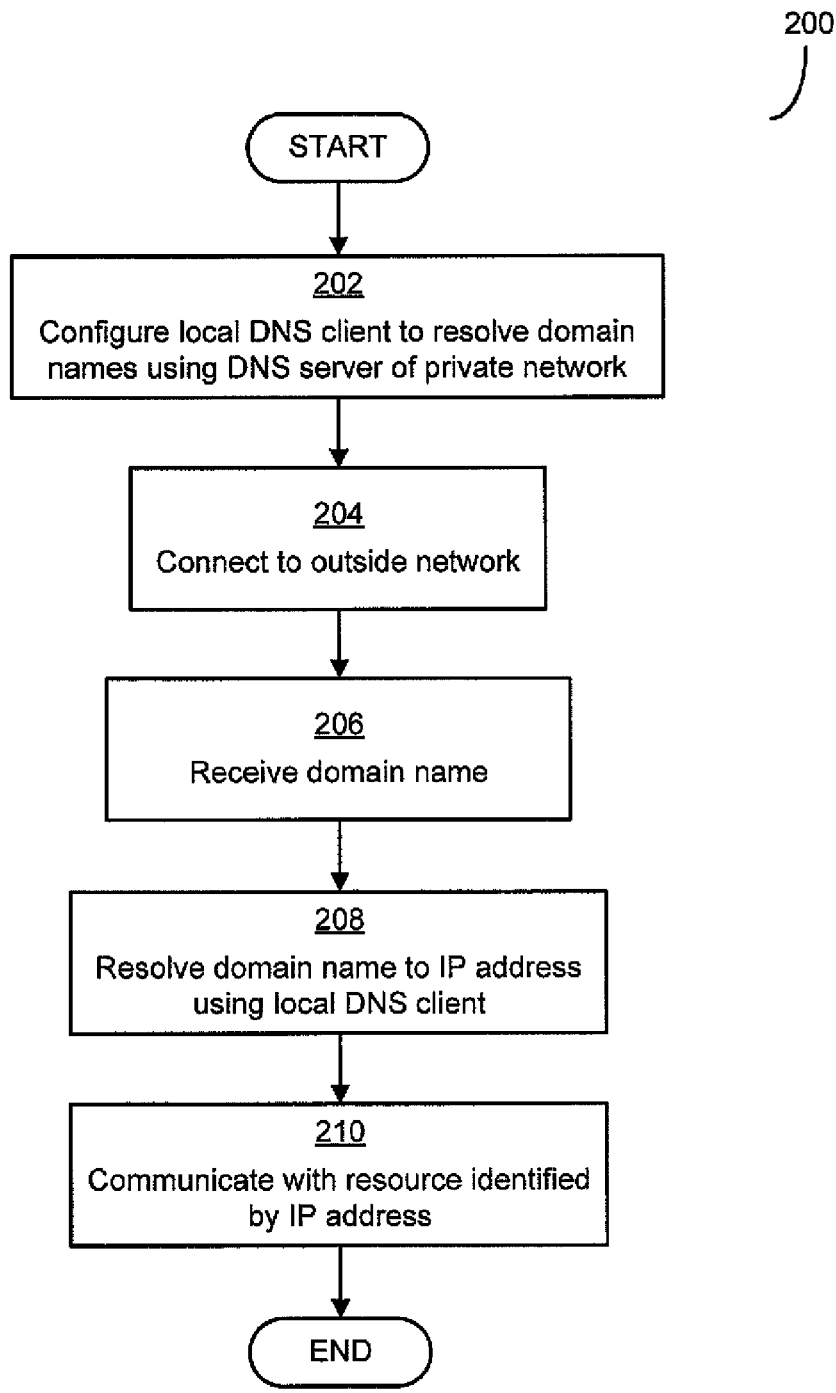
FIG. 2 is a flowchart of an illustrative process according to some embodiments of the invention for performing a domain name resolution by a client for a domain name associated with a private network resource when connected to an outside network.

In some embodiments of the invention that operate with DNS, however, a DNS client on a computing device 100 may be adapted to always use a DNS server of the private network 106 (e.g., DNS server 110) to resolve domain names, regardless of the network to which it is connected. In this embodiments, techniques are employed to enable the computing device 100 to access the DNS server of the private network from outside the private network. FIG. 2 shows one illustrative process that may be carried out by a computing device 100 operating such a DNS client. It should be appreciated, however, that process 200 is merely exemplary of the types of processes that may be implemented to carry out techniques described herein, and that others are possible.

Process 200 begins in block 202, in which a DNS client of the computing device 100 is configured to resolve domain names using the DNS server 110 of the private network 106. This may be done in any suitable manner. For example, a user (such as an administrator) of the computing device 100 may input the address of the DNS server 110 to the computing device 110. This input may be done manually, such as via a user interface of the computing device 100, automatically, such as via network settings distributed via a group policy of the Microsoft Active Directory, available from the Microsoft Corporation of Redmond, Wash., via the Dynamic Host Configuration Protocol (DHCP), or in any other way. As shown in FIG. 1, the DNS server 110 is connected to the private network 106, and thus access to the DNS server 110 may be limited. In some such implementations, the edge resource of the private network (e.g., reverse proxy 108) may not restrict access to DNS server 110, and may be adapted to permit DNS queries to be passed to the DNS server 110.

In other implementations, configuring the DNS client to use DNS server 110 may not comprise inputting the address of the DNS server 110 itself, but rather may comprise inputting the address of the reverse proxy 108 as the address of the DNS server that the DNS client should use. Thus, the reverse proxy 108 can relay communications to the DNS server. In other implementations, the reverse proxy 108 may additionally serve as a DNS server, and thus DNS server 110 and reverse proxy 108 may be implemented in the same device. Accordingly, in some embodiments of the invention, the reverse proxy 108 may perform various functions related to resolving a domain name. Exemplary functions that may be performed by a reverse proxy 108 in embodiments of the invention are described in greater detail below.

Regardless of how the DNS client is provisioned in block 202, in block 204 the computing device 100 connects to the outside network 104. In block 206, a domain name identifying a network resource is received (e.g., from a user of the computing device 100 or an application program executing on the computing device 100). This domain name may be any domain name, such as a publicly-resolvable domain name like "www.microsoft.com" or a private domain name, that is not usable outside the private network 106, such as "hrweb." A private domain name may be associated with a private network resource, such as web server 102.

In block 208, the DNS client of the computing device 100 resolves the domain name, using a private DNS server, to an IP address that may be used to communicate with the designated resource. This name resolution may be done in any suitable manner. In one embodiment, the name resolution may be carried out by querying the DNS server configured in block 202. If the domain name input in block 206 is a publicly-resolvable domain name, then the IP address received in response to the DNS query may be the IP address for the resource identified by the domain name. However, when the domain name is a private domain name for a private network resource like web server 102, in some embodiments of the invention, the IP address that is received by the DNS client of the computing device 100 in response to the resolution may be the IP address of the reverse proxy 108, and not the IP address of the private network resource. Exemplary techniques by which this resolution may be performed are described in detail below.

In block 210, the computing device 100 carries out communication with the resource identified by the IP address received in block 208 (e.g., the reverse proxy 108). When the designated resource is a private resource (e.g., web server 102), in some embodiments, the computing device 100 may be unaware that it is communicating directly with a device other than the designated resource (e.g., web server 102), as the communication of block 210 with the resource may be carried out indirectly via the reverse proxy 108 just as it would have been directly with the resource (e.g., with web server 102). Exemplary techniques by which reverse proxy 108 may enable this communication are described in detail below. Once communication has been carried out, the process 200 ends.

Using the process illustrated in FIG. 2, a domain name for a private network resource, like a web server 102, may be used to communicate with the private network resource even when a computing device 100 is connected outside of the private network (e.g., to an outside network 104).

Figure 3:
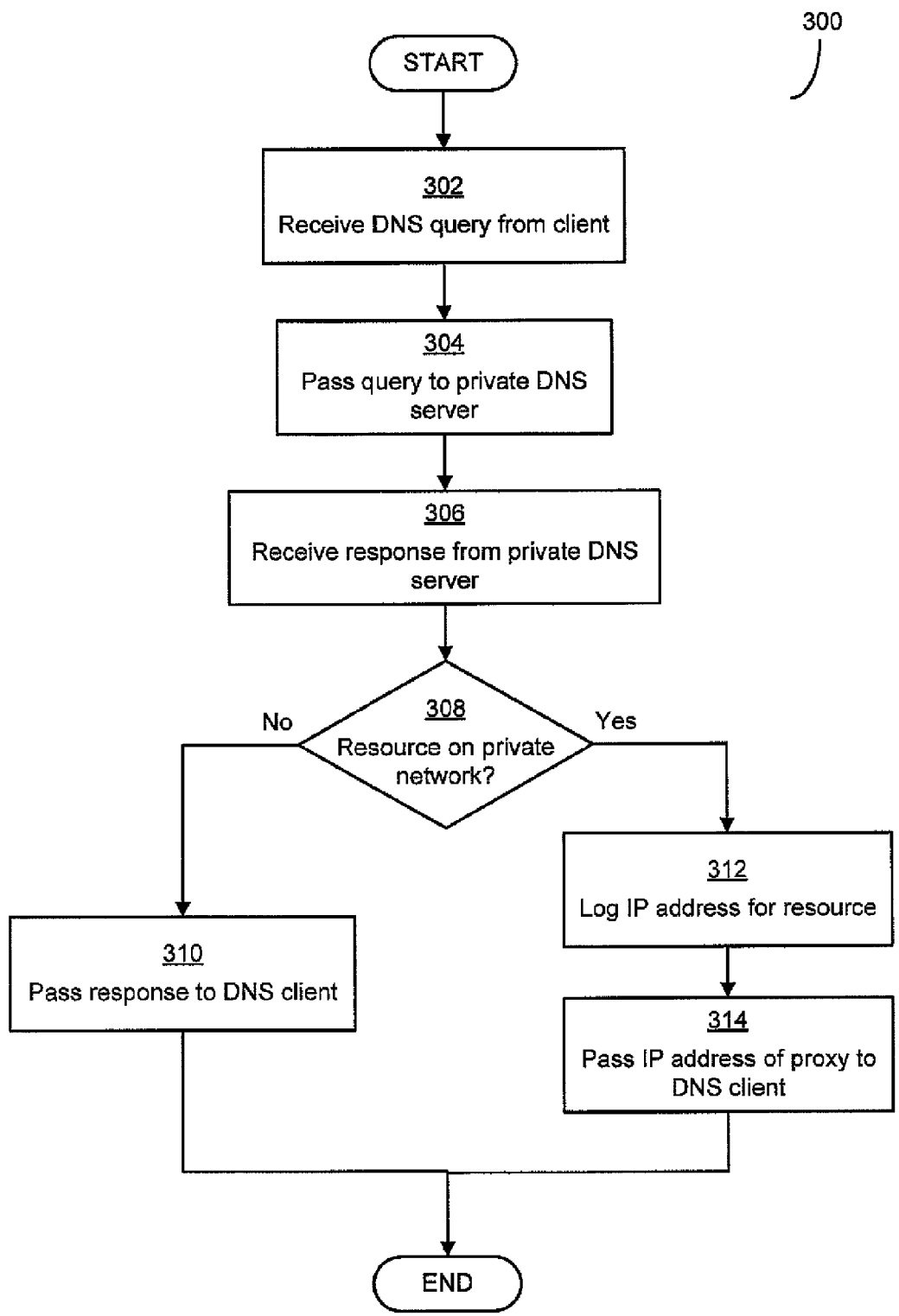
FIG. 3 is a flowchart of an illustrative process according to some embodiments of the invention for performing a domain name resolution by an edge resource of a private network for a domain name associated with a private network resource when a client is connected to an outside network.

Resolving a private domain name to the IP address of the reverse proxy 108 may be done in any suitable manner. As discussed above, in some embodiments of the invention, the reverse proxy 108 may perform functions related to this resolution. FIG. 3 shows an illustrative process 300 that may be carried out by a remote access facility implemented on the reverse proxy 108 during a DNS resolution. It should be appreciated, however, that process 300 is merely exemplary of the types of processes that may be implemented to carry out techniques described herein, and that others are possible.

Process 300 begins in block 302, in which the remote access facility on the reverse proxy 108 receives a DNS query from a DNS client. The DNS query may contain any suitable domain name, including a publicly-resolvable domain name (e.g., "www.microsoft.com") or a private domain name for a private network resource (e.g., "hrweb"). As discussed above in connection with block 202 of FIG. 2, this DNS query may have been transmitted to the reverse proxy 108 itself—such as in embodiments of the invention where a DNS client is provided with the IP address of reverse proxy 108 as the IP address of a DNS server—or may have been transmitted to the DNS server 110 and passed through the reverse proxy 108.

In block 304, the remote access facility passes the DNS query to private DNS server 110 to resolve the domain name to an IP address and, in block 306, receives a response from the DNS server 110.

In block 308, the remote access facility determines whether the domain name was a publicly-resolvable domain name or a private domain name. This determination may be made in any suitable manner, including by examining the IP address contained in the response received in block 306. IP addresses may vary depending on which network they are associated with, and it may be possible to identify whether the domain name is a private domain name by determining whether the IP address matches characteristics of IP addresses for the private network 106. For example, IP addresses of the private network 106 may be in the format of "10.1.*.*" (where * indicates any number) and if an IP address in the response matches that format (e.g., 10.1.1.1) it may be determined that the IP address is one associated with a private domain name for a private network resource. IP addresses that do not match that format may be determined to be associated with publicly-resolvable domain names and not with private domain names or private network resources.

If it is determined in block 308 that the domain name is not a private domain name and not associated with a private network resource, then in block 310 the result of the DNS query may be passed back to the DNS client and computing device 100 that issued the query, and the process 300 ends.

If, however, it is determined in block 308 that the domain name is a private domain name and is associated with a private network resource, then the remote access facility may take one or more actions to ensure that the computing device 100 that issued the DNS query is able to communicate with the private network resource. For example, if the private network resource is web server 102, then if the computing device 100 attempts to communicate with the web server 102 directly using the IP address returned by the DNS server 110, one or more of the security facilities of the private network 106 may stop the computing device 100 from performing this communication.

The remote access facility may take any suitable action to enable computing device 100 to communicate with a private resource (e.g., web server 102). For example, when it is determined in block 308 that the domain name is a private domain name, then in block 312 the reverse proxy 108 may make a record of the IP address returned in the DNS response received in block 306 by storing the IP address in any suitable manner. Then, in block 314, the reverse proxy 108 may edit the DNS response to provide its own IP address (i.e., the IP address of the reverse proxy 108), and pass this edited DNS response to the computing device 100, and the process 300 ends.

By editing the DNS response in this manner, the remote access facility forces the computing device 100—in some implementations, without the knowledge of the computing device 100—to direct communications that are intended for a private resource (e.g., the web server 102) to be sent directly to the reverse proxy 108. The computing device 100 may do so because the edited DNS response may only indicate that the IP address contained therein (which is actually the IP address of the reverse proxy 108) is the IP address associated with the domain name for which the computing device 100 issued a DNS query. The reverse proxy 108 may then receive all communications that are intended for the private resource (e.g., web server 102), and determine whether to pass those communications to the private resource (e.g., web server 102) by applying the security rules established for the private network 106. In this way, the security limitations of the private access 106 may be preserved, but remote access to the private network 106 may be enabled. Exemplary techniques that may be implemented by a reverse proxy 108 for routing communications are described in greater detail below.

While not illustrated in FIG. 3, in some implementations, when a domain name is determined by the remote access facility in block 308 to be a private domain name, another decision may be made regarding whether to pass any IP address back to the computing device 100 that sent the response. This decision may be made in accordance with the security limitations established for the private network 106. For example, the security limitations may identify one or more network resources to which remote access is not to be granted. If a request is received for one of those prohibited network resources, then the remote access facility may determine that remote access should not be granted to the computing device 100 that issued the DNS query. In this case, the remote access facility may compose a response to the DNS query indicating that the domain name could not be resolved and provide no IP address to the computing device 100. Without an IP address to use in transmitting communications, the computing device 100 will be unable to communicate with the private resource, either directly or indirectly via the reverse proxy 108.

As discussed above, the process 300 of FIG. 3 is only one example of processes that may be implemented by a remote access facility to allow for resolution of domain names by a computing device outside the private network 106, as other processes are possible. As discussed above, the reverse proxy 108 may also be configured to be a DNS server, such that reverse proxy 108 and DNS server 110 are the same device. In embodiments of the invention that implement such a device, the process 300 may be altered such that a DNS query is not passed to a separate device, but rather is handled locally by the DNS functionality of the reverse proxy 108.

Other processes may also be implemented by a DNS client of a computing device 100 to resolve domain names. As discussed above in connection with FIG. 2, in some embodiments of the invention, the DNS client of the computing device 100 may be configured to pass all DNS queries to the private DNS server. In alternative embodiments of the invention, the computing device 100 may be configured to carry out DNS queries for publicly-resolvable domain names using a public DNS server, such as the DNS server 112 of the outside network 104, and carryout DNS queries for private network resources using the private DNS server. Accordingly, a DNS client may be configured to maintain two different DNS servers.

Figure 4:
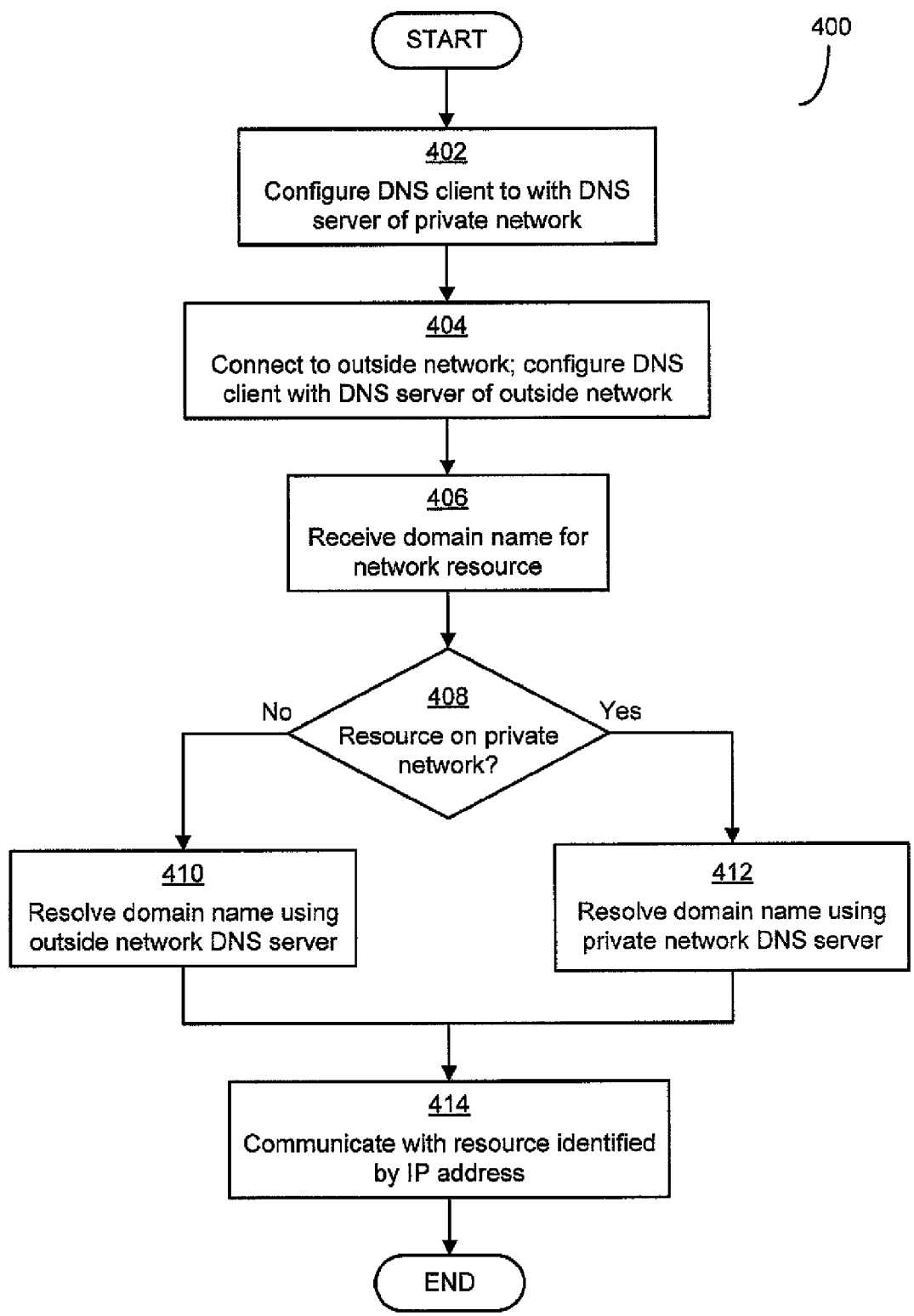
FIG. 4 is a flowchart of an illustrative process according to some embodiments of the invention for performing a domain name resolution by a client for a domain name associated with a private network resource when connected to an outside network.

FIG. 4 shows an illustrative process 400 that may be carried out by a DNS client of a computing device 100 that is configured with two different DNS servers. It should be appreciated, however, that process 400 is merely exemplary of the types of processes that may be implemented to make private identifiers (e.g., private domain names) resolvable outside a private network, and that others are possible.

Process 400 begins in block 402, in which a DNS client is configured with an IP address for DNS server 110 of the private network. This may be done in any suitable manner, including by using any of the techniques described above in connection with block 202 of FIG. 2.

In block 404, the computing device 100 may be connected to an outside network 104 and may be configured to communicate with the outside network 104. Configuring the computing device 100 may include configuring the DNS client of the computing device 100 to use the DNS server 112 of the outside network 104 to resolve domain names. This may be done in any suitable manner, including by known techniques such as the Dynamic Host Configuration Protocol (DHCP).

In block 406, a domain name identifying a network resource is received by the computing device 100 (e.g., from a user of the computing device 100 or an application program executing on the computing device 100). This domain name may be any domain name, such as a publicly-resolvable domain name like "www.microsoft.com" or a private domain name, that is not usable outside the private network 106, such as "hrweb." A private domain name may be associated with a private network resource, such as web server 102.

In block 408, prior to resolving the domain name received in block 406, the DNS client of the computing device 100 may determine whether the domain name is a publicly-resolvable domain name or a private domain name associated with a private network resource. This decision may be made to determine which of the two DNS servers with which the DNS client is configured should be used to resolve the domain name. This determination may be made in any suitable manner, such as by comparing the domain name to a listing of known private domain names (e.g., a listing of domain names known to be associated with the private network 106). This listing may be stored in any suitable manner, such as in a HOSTS file on the computing device 100 or in any other manner.

If it is determined in block 408 that the domain name is not a private domain name, and/or if it is determined that it is a publicly-resolvable domain name, in block 410 the DNS client may resolve the domain name using the DNS server 112 of the outside network 104. This resolution may be carried out in any suitable manner, including by conventional DNS resolution techniques.

If, however, it is determined in block 408 that the domain name is a private domain name, then in block 412 the DNS client may resolve the domain name using the DNS server 110 of the private network 106. This resolution may be carried out using the private network 106 in any suitable manner, including by any of the techniques described above in connection with FIG. 3.

Once the domain name is resolved in one of blocks 410 and 412, the computing device 100 may communicate with the resource identified by the IP address obtained during the resolution, and the process 400 ends.

In the techniques described above for resolving a private domain name, a private domain name was resolved using a private DNS server, such as the DNS server 110 of private network 106. This may be done in some embodiments of the invention. However, in other embodiments, a private domain name may be made publicly resolvable, such that the computing device 100 need not contact a private DNS server. This may be done in any suitable manner.

Some embodiments of the invention that make a private domain name publicly resolvable may do so using DNS suffixes. DNS clients conventionally use DNS suffixes to make complete domain names, also known as fully-qualified domain names (FQDN), when only a partial domain name, also known as a partially-qualified domain name (PQDN), is received. A fully-qualified domain name is one that is complete and unambiguous, and includes a top-level domain (TLD). A TLD is the last part of a FQDN, such as the commonly-known endings of domain names like ".com," ".org," ".net," and others, but it should be appreciated that any identifier, public or private, may be used as a TLD.

Because DNS is only capable of resolving FQDNs (and not PQDNs), DNS suffixes may be appended to input PQDNs to make FQDNs. For example, when a user inputs a portion of a domain name rather than the entire domain name, such as "microsoft" instead of "microsoft.com," the DNS client of the computing device may append the suffix ".com" to the input domain name to make a fully-qualified domain name that is resolvable. Typically, suffixes are appended one at a time and a resolution is attempted using each of the suffixes, until one of the suffixes produces an FQDN that successfully resolves. A successful resolution in DNS may produce several suitable results, including an IP address that is associated with the FQDN. Conventionally, these suffixes are restricted to top-level domain names.

Appending of DNS suffixes may also be done in a manner that is transparent to the user or application that input the PQDN to which the suffix was appended. Since the suffix is only used in the DNS resolution process—i.e., only used in issuing the DNS query—the domain name that is used by the user/application is still the partially-qualified domain name.

Applicants have appreciated that private network resources are often identified by partially-qualified domain names, and not FQDNs. Further, private network resources are often identified using PQDNs known as "flat names" that include only one label, such as "hrweb", rather than multiple labels such as "hrweb.corp" (though a private network resource that are identified by a PQDN may be identified using any suitable identifier). Such a private domain name—without a TLD—is not a fully-qualified domain name, and a suffix may need to be appended to make the domain name fully-qualified and resolvable.

In some embodiments of the invention, a DNS client of a computing device 100 may be provisioned with a DNS suffix that identifies the private network 106. When a partially-qualified domain name is received, this DNS suffix may be treated like other DNS suffixes and appended to the PQDN to make a FQDN. For example, a suffix for a private network may be "remoteaccess.corporate.com". This suffix may then be appended to a PQDN to make an FQDN that is resolvable.

Fully-qualified domain names corresponding to each of the private network resources to which remote access should be granted (e.g., formed using the private domain name and the suffix, such as "hrweb.remoteaccess.corporate.com") may then be published throughout the DNS system, including over a publicly-available network such as the Internet. By doing so, DNS servers available on public networks may have entries corresponding to these FQDNs. These entries may also specify an IP address corresponding to the FQDN. As discussed above, in some embodiments of the invention this IP address may be an IP address for the private network resource corresponding to the domain name, such as the web server 102. In other embodiments, however, the IP address may be for another network device, such as the IP address of the reverse proxy 108.

Figure 5:
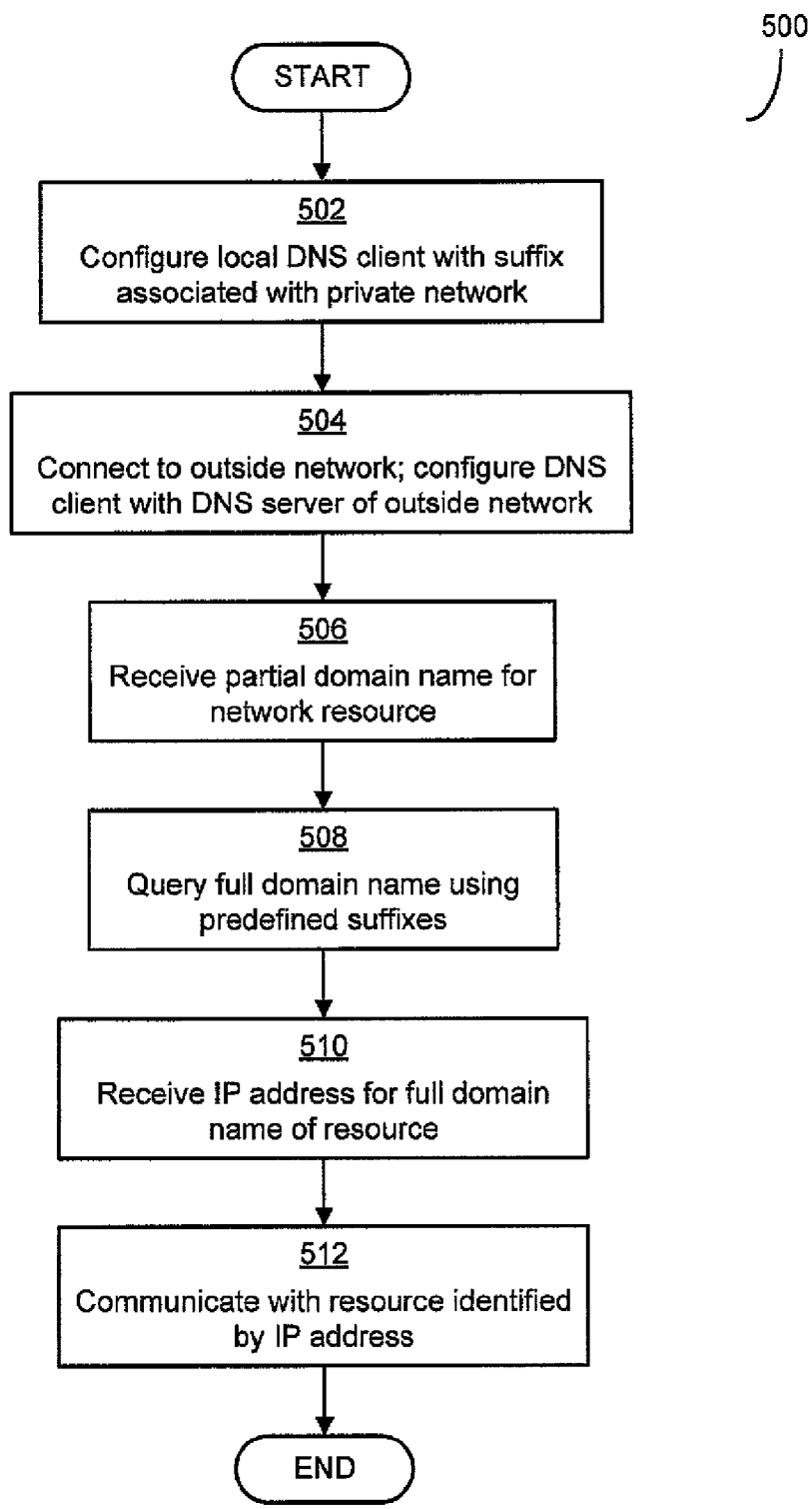
FIG. 5 is a flowchart of an illustrative process according to some embodiments of the invention for resolving a partially-qualified domain name associated with a private network resource when a client is connected to an outside network.

FIG. 5 shows an illustrative process 500 that may be implemented by a computing device 100 operating in a computer system in which public DNS servers, such as DNS server 112, have entries corresponding to FQDNs for each private network resource. It should be appreciated, however, that process 500 is merely exemplary of the types of processes that may be implemented to resolve a private identifier from outside a private network, and that others are possible.

Process 500 of FIG. 5 begins in block 502, in which a DNS client of the computing device 100 is configured with at least one suffix associated with the private network 106. This configuration may be performed in any suitable manner, including by using any of the exemplary techniques described above in connection with block 202 of FIG. 2.

In block 504, the computing device 104 connects to an outside network, such as outside network 104, and may be configured to communicate with the outside network 104. Included in this configuration may be configuring the DNS client of the computing device 100 to use the DNS server 112 of the outside network 104 to resolve domain names. This may be done in any suitable manner, including by known techniques such as the Dynamic Host Configuration Protocol (DHCP).

In block 506, the computing device 100 receives as input a partially-qualified domain name, and inputs this PQDN to the DNS client. This domain name may be received from any suitable source, including a user of the computing device 100 or an application program executing on the computing device 100. The PQDN received in block 506 may be associated with any suitable network resource, including a private network resource such as the web server 102.

In block 508, an FQDN is created by the DNS client combining the PQDN of block 506 with one of the DNS suffixes with which the DNS client is configured. As a result of the configuration of block 502, one of these suffixes may be a suffix corresponding to the private network 106, such as "remoteaccess.corporate.com." The DNS client may append, one at a time, each of the suffixes with which it is configured, and attempt to resolve each of them by issuing a DNS query to the DNS server 112 of outside network 104. The DNS client may continue trying each of these suffixes, in any suitable order, until one of them is detected as resolvable by the DNS server 112 and a corresponding IP address is received in response. As a result of prior publishing of FQDNs for the private network resources, the DNS server 112 may have an entry corresponding to the domain name received in 506, such as an entry corresponding to "hrweb.remoteaccess.corporate.com" when the originally-input domain name is "hrweb." In some embodiments, a resolution process performed by the DNS server 112 may comprise forwarding the DNS query to one or more other DNS servers, such as in the case where the DNS server 112 does not have an entry for the FQDN locally. This forwarding of DNS queries may be performed in any suitable manner, including according to any known DNS techniques.

In block 510, the DNS client receives a response to its DNS query that includes an IP address corresponding to the FQDN. As in other examples described above, in some embodiments of the invention the IP address corresponding to the FQDN may be an IP address for the reverse proxy 108, rather than the desired private network resource (e.g., web server 102). This may be done to force the computing device 100 performing the DNS resolution, perhaps without its knowledge, to pass all communications intended for the private network resource through the reverse proxy 108 so that the reverse proxy 108 may apply one or more security rules to ensure that security limitations of the private network 106 are preserved. For example, once the FQDN is resolved and the computing device 100 attempts to communicate using the IP address, the reverse proxy 108 may request that the computing device 100 authenticate itself with the private network 106 (such as by providing a valid username and/or password) and if the computing device 100 is not authenticated, the reverse proxy 108 may disallow communications.

In block 512, once the FQDN is resolved to the IP address received in block 510, the computing device 100 communicates with the network resource identified by the IP address, and the process 500 ends.

Exemplary techniques are described above (and some are described below) for making an identifier for a private network resource usable to communicate with the private network resource from an outside network 104. These techniques are described using domain names and the Domain Name System (DNS). It should be appreciated, however, that any suitable resolution technique may be used, including extensions to DNS such as the Domain Name System Security Extensions (DNSSEC) or any technique other than DNS.

Further, it should be appreciated that once an identifier for a private network resource, such as a domain name for a private network resource, is resolved to an IP address, communication may take place between a computing device and the private network resource directly or indirectly (e.g., via a reverse proxy server) in any suitable manner. Techniques for carrying out this communication are described below, but it should be appreciated that these techniques are merely illustrative, and that embodiments of the invention are not limited to carrying out communication according to any particular technique.

Figure 6:
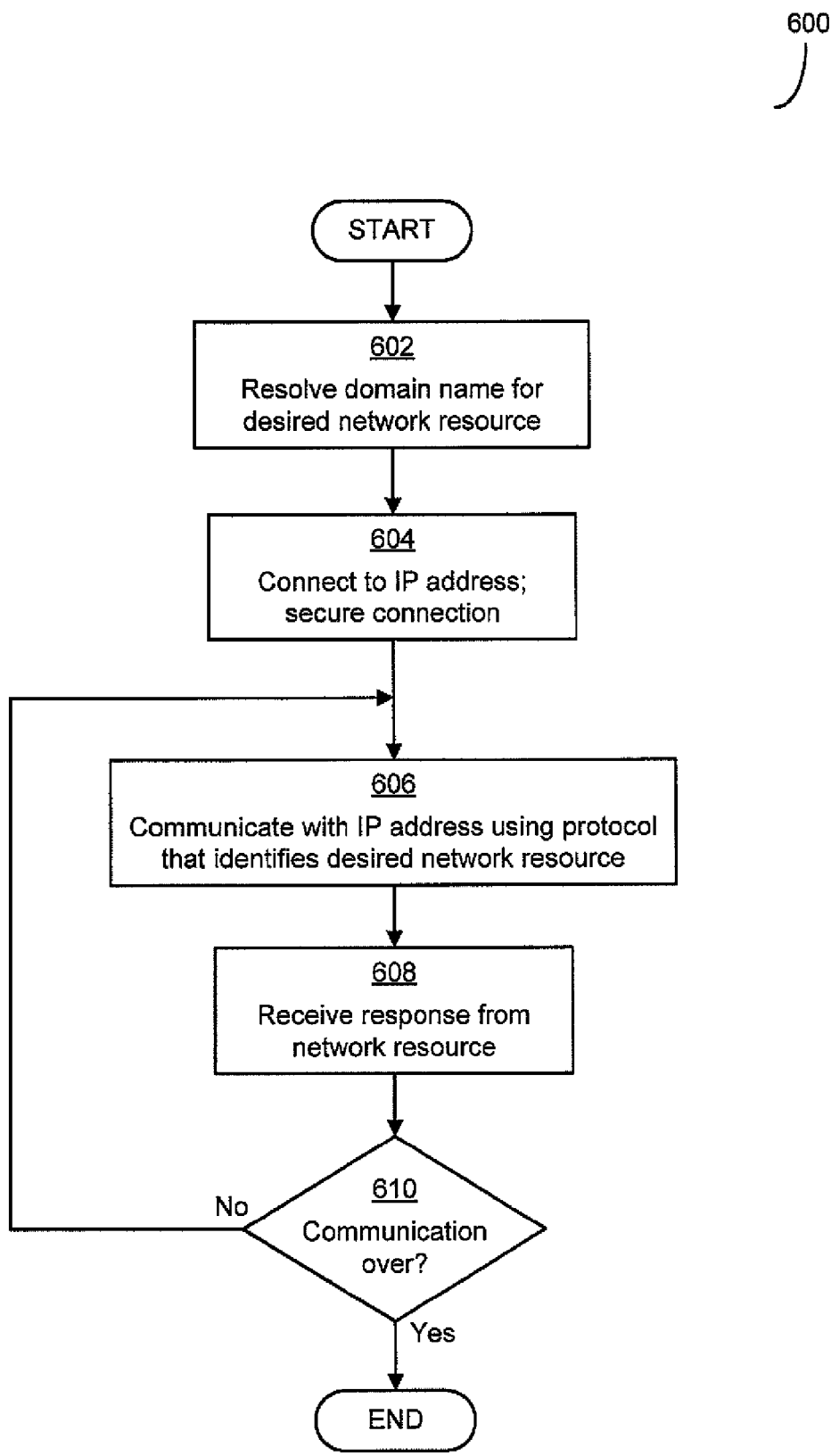
FIG. 6 is flowchart of an illustrative process according to some embodiments of the invention for communicating between a client connected to an outside network and a network resource of a private network.

FIG. 6 shows one such technique for carrying out this communication that may be implemented by a computing device 100 in some embodiments of the invention. The illustrative process 600 of FIG. 6 begins in block 602, in which a domain name for a private network resource is resolved to an IP address. In this example, the IP address is one associated with a reverse proxy 108, but it should be appreciated that the IP address may be associated with any suitable network resource on the private network. The resolution of block 602 may be done in any suitable manner, including according to any of the techniques described above. In block 604, a connection is established to the reverse proxy 108 as identified in block 602. In some embodiments of the invention, the connection established in block 604 may be secured using one or more security techniques. For example, the connection may be encrypted and/or authenticated using a security technology such as Internet Protocol Security (IPsec) or any other security technology. This security may be implemented based on a request input by a user, a request of the reverse proxy 108 upon connecting to the reverse proxy 108 (e.g., when the reverse proxy 108 instructs the computing device 100 to provide authentication credentials), configuration settings of the computing device 100, or in any other way. For example, a security policy of the computing device 100 may be configured to require a connection to the reverse proxy 108 to be secured using one or more security technologies, such as by IPsec.

In block 606, once a connection to the reverse proxy 108 is opened and/or secured, the computing device 100 may begin communicating with the reverse proxy 108. As discussed above, the computing device 100 may be attempting to communicate with a particular private network resource, such as a web server 102, but as a result of the DNS resolution that provided the IP address for the reverse proxy 108, the computing device 100 may communicate with the reverse proxy 108. This may be done without the knowledge of the computing device 100; that is, in some embodiments, the computing device 100 may not be aware that the IP address received in block 602 is not the IP address of the private network resource (e.g., web server 102, in the example above), and may communicate with the reverse proxy 108 as if it were the private network resource. The reverse proxy 108 may then, using any suitable technique including the exemplary techniques described below, forward these communications to the private network resource (e.g., web server 102).

Communications in block 606 may be passed in any suitable format, according to any suitable protocol. In some embodiments of the invention, these communications may be passed according to a protocol that embeds in the communications the originally-input identifier in the communications so that it can be used by the reverse proxy 108 to determine where the forward received communications within the private network 106

For example, the HyperText Transfer Protocol (HTTP) and the Transport-Layer Security (TLS) protocols, among others, may include headers in each communication that identify various properties of the communication. Included in these properties is an identifier for the "host" device for which the communications are intended. The identifier may take any suitable form, and in some environments where HTTP/TLS are used in connection with DNS, the identifier may be the originally-input domain name for the host device that was input to a DNS client to be resolved to an IP address through DNS processes.

In embodiments of the invention which communicate according to protocols like HTTP and TLS, the identifier embedded in the header of the communications may be the domain name originally received in block 602 and resolved by the DNS client of the computing device 100. For example, where the domain name received was "hrweb" and was resolved in any suitable manner (e.g., by passing "hrweb" to a DNS server like DNS server 110, or by creating an FQDN like "hrweb.remoteaccess.corporate.com" to be resolved, or by resolution in any other manner) the identifier embedded in the header may be the originally-input identifier "hrweb."

Communications including this header may be passed to the remote proxy 108 in block 606. In block 608, the computing device 100 may receive a response from the desired private network resource, such as a requested web page from web server 102, via the reverse proxy 108. As shown in block 610, blocks 606 and 608 may be repeated until communication is completed—for example, when an employee of a corporation associated with the private network 106 has finished a task or has finished working remotely—and the process 600 ends.

The reverse proxy 108 may be adapted in any suitable manner to identify a recipient of communications that it receives, when those communications are intended for a private network resource such as the web server 102. For example, in some embodiments such as ones described above in connection with FIGS. 2 and 4, if a computing device 100 is adapted to pass a private identifier, such as a private domain name, through the reverse proxy 108 to resolve the private identifier with private DNS server 110, the reverse proxy 108 may maintain a record of which domain names are queried and by which computing devices. When a communication is received from a computing device 100, then reverse proxy 108 may determine from its records the domain name queried by the computing device 100, assume that the communication is intended for the queried domain name, and pass the communication to the private network resource (e.g., web server 102) identified by that domain name. Similarly, when the reverse proxy 108 receives a response from the private network resource, it may then forward that response to the computing device 100 that its record indicate issued the query to that private network resource.

In alternative embodiments of the invention, however, the reverse proxy 108 may be able to determine from the communications themselves the private network resource for which the communications were intended. For example, as discussed above in connection with FIG. 6, in some embodiments the computing device 100 may exchange communications with the reverse proxy 108 according to a protocol that embeds in the communications an identifier for the desired network resource. When the reverse proxy 108 receives such a communication, the reverse proxy 108 may examine the communication to determine the intended recipient.

Figure 7:
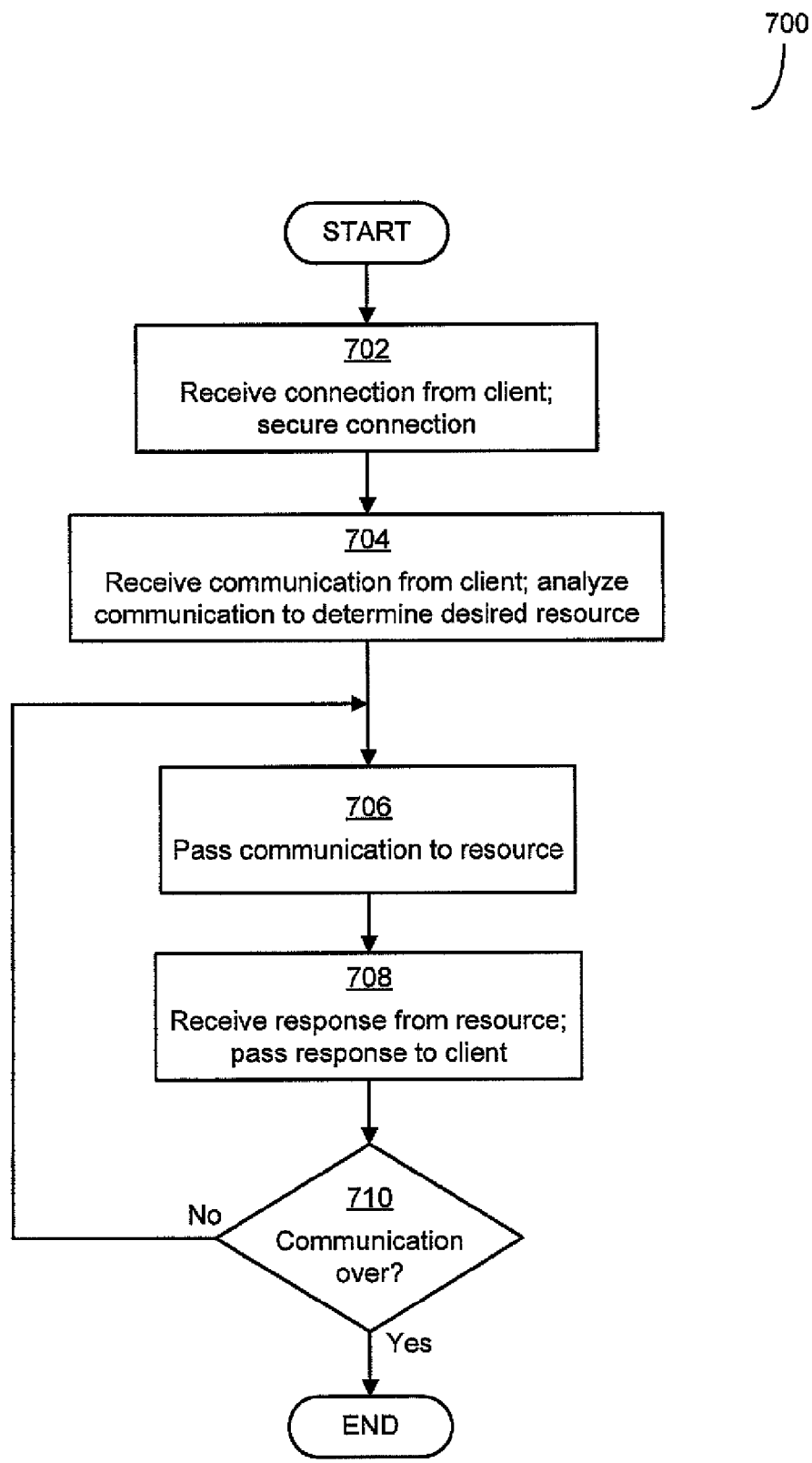
FIG. 7 is a flowchart of an illustrative process according to some embodiments of the invention that an edge resource of a private network may follow when regulating communications between a client connected to an outside network and a network resource of the private network.

FIG. 7 shows one example of a process 700 that may be implemented by a remote access facility of a reverse proxy 108 for determining a private network resource to which to forward communications received from a computing device outside the private network (e.g., computing device 100). Process 700 may be implemented in embodiments of the invention wherein a computing device 100 exchanges communications with the reverse proxy 108 according to protocols (e.g., HTTP, TLS, and others), that embed in the communications an identifier for the intended recipient of the communication. It should be appreciated, however, that the process 700 is merely illustrative of the types of process that may be implemented in embodiments of the invention. When techniques described herein are implemented that handle communications according to these protocols, other processes may be implemented that determine how to forward the communications in other ways. Further, it should be appreciated that these protocols are only one example of the types of protocols that these techniques may be implemented to handle, and that processes may be implemented to handle other types of protocols.

Process 700 begins in block 702, in which the reverse proxy 108 receives a connection from a computing device 100 connected to an outside network 104. The remote access facility of the reverse proxy 108 may take any suitable action to open the connection, including using one or more security technologies, including IPsec, to secure the connection.

In block 704, the remote access facility receives a communication from the computing device 100 that has embedded within it an identifier for a private network resource for which the communication is intended. The remote access facility may then analyze the communication to locate this identifier. For example, for a communication transmitted according to the HTTP protocol, the communication may have a header that includes an identifier for a "host" device. The identifier may be a domain name for the host that was originally-input to the computing device 100, prior to the connection being opened. The remote access facility may then use the identifier for the host device to locate the private network resource (e.g., web server 102) to which the communication should be passed.

In block 706, the communication may be passed to the private network resource identified in the communication. This may be done in any suitable manner. In some implementations, the remote access facility may resolve the identifier in the communication to an IP address, which may be done by examining local records of domain names and IP addresses (such as those created in block 312 of FIG. 3) or passing the identifier to private DNS server 110.

In block 708, the remote access facility receives a response from the private network resource to be forwarded to the computing device 100 and forwards that response to the computing device 100. This may be done in any suitable manner, such as by maintaining a listing of open connections from computing devices on the outside network 104, the private network resources with which those computing devices are performing communication, the types of information transmitted to or requested from those private network resources, and/or any other suitable information. Based on this information, the remote access facility may determine to which computing device of the outside network 104 the response should be forwarded, and in block 708 forwards the response to the computing device 100.

As shown in block 710, blocks 706 and 708 may be repeated until communication is completed—for example, when an employee of a corporation associated with the private network 106 has finished a task or has finished working remotely—and the process 700 ends.

While not illustrated in FIG. 7, it should be appreciated that a remote access facility of the reverse proxy 108 may take any suitable action to apply one or more security policies of the private network 106. For example, when a computing device 100 of the outside network 104 opens a connection in block 702, the remote access facility may determine whether the computing device 100 is authorized to remotely access the private network 106. Additionally or alternatively, in block 704 the remote access facility may determine whether a communication received from the computing device 100 is associated with an allowed or disallowed remote access activity, and/or is intended for a private network resource that is allowed or disallowed from being remotely accessed. For example, if the communication received in block 704 is associated with retrieving a web page from web server 102, then the communication may be allowed, but if the communication is requesting a particular secure document from a file server, the remote access facility may disallow the activity. If an activity is disallowed by the remote access facility, the remote access facility may take any suitable action in response. For example, in some embodiments, the remote access facility may inform the computing device 100 that the activity is disallowed. Informing the computing device may be done in any suitable manner, and may depend on the type of activity being requested or performed. For example, if the disallowed communication was one requesting a particular secure web page, and the remote facility disallowed that activity to prevent the secure web page from being transmitted outside the private network 106, the remote access facility may instead transmit in the response a substitute web page indicating that security limitations do not allow access to that web page outside the private network 106.

In addition to or instead of passively passing communications back and forth between a computing device 100 and a private network resource, a remote access facility of a reverse proxy 108 may take any suitable action to edit those communications. For example, the remote access facility may insert and/or remove information relating to security policies.

In some embodiments of the invention, the remote access facility may also perform functions that enable communications to be passed properly that otherwise may not have as a result of the manner in which remote access is being achieved. For example, in some embodiments the remote access facility may carry out functions related to HTTP cookies. HTTP cookies are one way that a web server and/or web client can store information related to a web session. For example, if a web client has a user name for a user of the web client that the web server needs to be passed to the web server before the web server will supply information to the web client, that information may be received from the user and stored locally on the web client in an HTTP cookie. As another example, if the web client is collecting information regarding products for purchase from a commercial web site, then the web client may store information regarding those products (e.g., the "shopping cart") locally on the web client in an HTTP cookie to be later sent to the web server when a user of the web client elects to make that purchase.

Because HTTP cookies may store sensitive information (e.g., a username to be sent to the web server), a web client may take various steps to make sure those HTTP cookies are storable in a unique way, such as associated with a particular unique domain name, and only retrievable by that particular unique domain name. To ensure that HTTP cookies are associated with a unique domain name, the web client may restrict use of cookies to only web servers that have fully-qualified domain names (FQDN).

As discussed above, a private identifier used for a private network resource, like a domain name for a web server 102, may be a partially-qualified domain name (PQDN) and not a fully-qualified one, such as the single label "hrweb." Even if an FQDN is formed by a DNS client to resolve a PQDN, the PQDN may be the identifier used to access the private network resource. Because there is a risk that a PQDN may not be a unique name, the web client of a computing device 100 accessing the web server 102 from the outside network may not allow the use of HTTP cookies associated with the web server 102.

Some web sites, however, depend on HTTP cookies to function properly, and thus in some cases the web site of the web server 102 may not display properly on the computing device 100 when HTTP cookies are disallowed. Such malfunctioning may affect the user experience. In some embodiments, a remote access facility of the reverse proxy 108 may therefore take one or more actions to enable HTTP cookies for the connection between the computing device 100 and reverse proxy 108, although not all embodiments need provide this functionality.

Figure 8A:
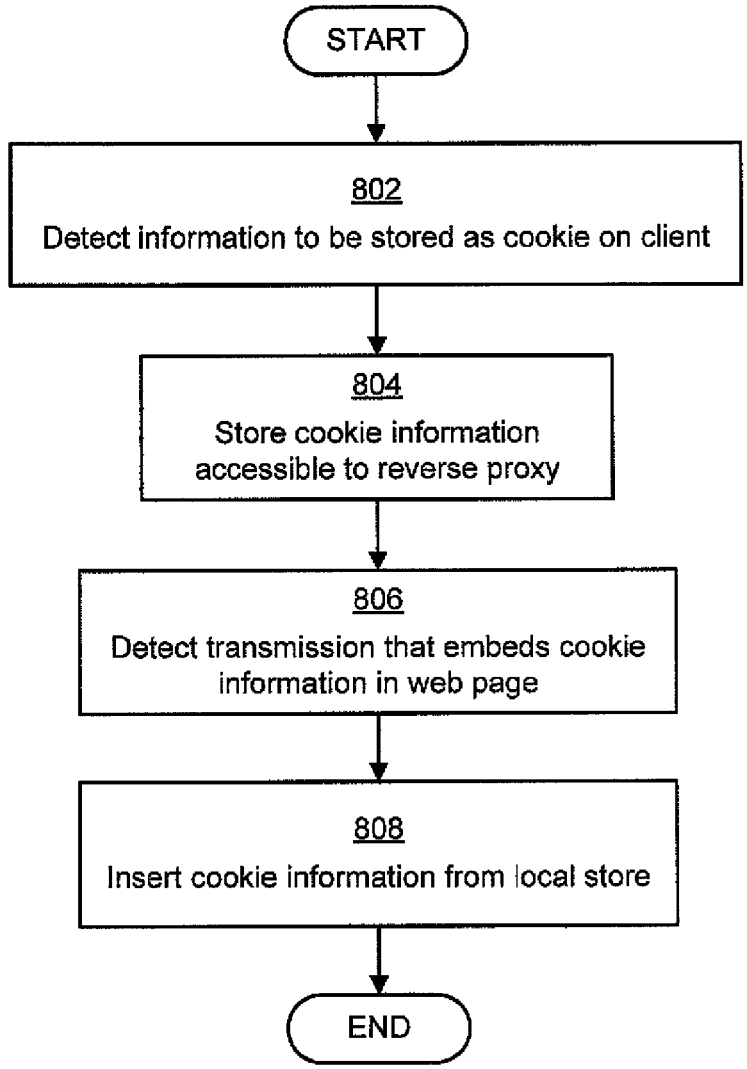
FIGS. 8A and 8B are flowcharts of illustrative processes according to some embodiments of the invention that may be implemented by an edge resource of a private network to support HyperText Transfer Protocol (HTTP) cookie functionality.
Figure 8B:
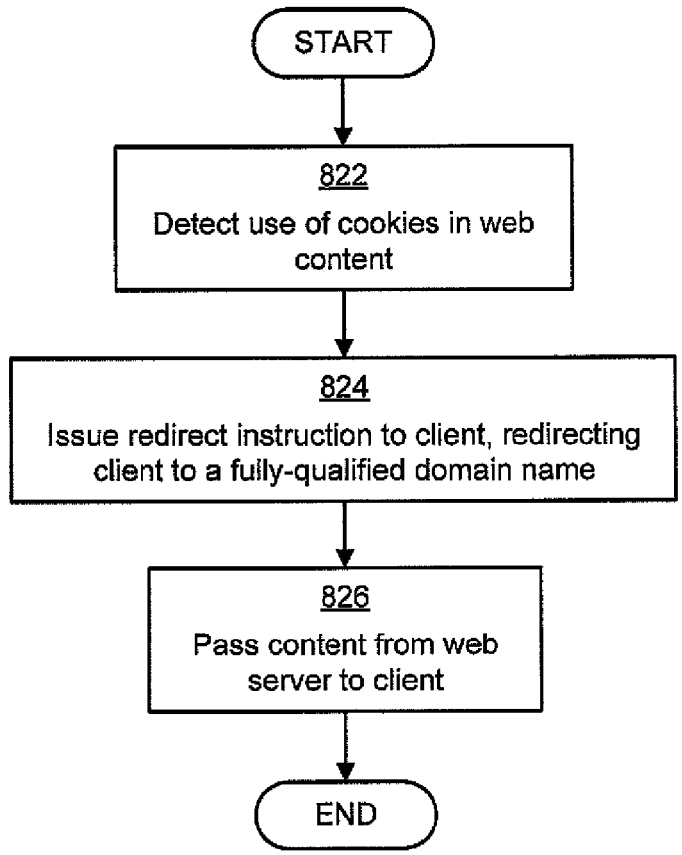

FIGS. 8A and 8B show two examples of processes that may be used by the remote access facility of the reverse proxy 108 to enable use of HTTP cookies. It should be appreciated, however, that process 800A and 800B of FIGS. 8A and 8B are merely illustrative of the types of processes that may be implemented by a remote access facility that is adapted to enable HTTP cookies, and that others are possible. Further, it should be appreciated that not all remote access facilities may be implemented to enable HTTP cookies, as embodiments of the invention are not so limited.

Process 800A begins in block 802, in which the remote access facility, while exchanging information between a computing device 100 and a web server 102, detects that information is to be stored by the web client of the computing device 100 as an HTTP cookie. This detection may be done in any suitable manner, such as by detecting, in web content transmitted between the web server 102 and the computing device 100, an instruction that may result in an HTTP cookie being stored. The remote access facility may be aware that the web client of the computing device 100 will not allow cookies, because the remote access facility may be aware that the identifier used to connect to the web server 102 was not a fully-qualified domain name. Accordingly, in block 804, upon making this detection, the remote access facility may identify the information to be stored and store it in a manner making it accessible to the reverse proxy 108. This may include storing the cookie information locally, on the reverse proxy 108, or at a remote location accessible to the reverse proxy 108. This information may be stored in any suitable manner, and may be associated with the connection, computing device 100, and/or web server 102.

In block 806, while exchanging information between a computing device 100 and web server 102, the remote access facility may detect that information that should have been stored in an HTTP cookie (which may have been disallowed by the web client of the computing device 100) is to be used. This detection may be made in any suitable manner, including by examining contents of a web page being transmitted to identify a portion of a web page that is requesting information stored in a cookie. For example, the code of a web page, including HyperText Markup Language (HTML) code of the web page, may include a reference to information that should be stored in a cookie, and this code may be detected by the remote access facility. The information in the HTTP cookie could be used in any suitable manner, such as by transmitting it to the web server 102, or by inserting it into the content being transmitted between the computing device 100 and web server 102. Upon this detection, the remote access facility may, in block 808, perform the detected action (e.g., transmitted information to the web server 102, inserting information into the content, etc.) itself using information stored in the locally-stored HTTP cookie from block 804. In this way, by storing HTTP cookie information locally, the remote access facility may enable use of HTTP cookies over the connection and keep the web page hosted by the web server 102 functioning properly on the computing device 100.

FIG. 8B shows an alternative process 800B for enabling use of HTTP cookies over the connection between the computing device 100 and web server 102.

Process 800B begins in block 822, in which the remote access facility of the reverse proxy 108, while exchanging messages between the computing device 100 and the web server 102, detects that an HTTP cookie is to be created and/or used. This detection may be made in any suitable manner, including by any of the examples described above in connection with block 802 of FIG. 8A. The remote access facility may be aware that the web client of the computing device 100 will not allow cookies, because the remote access facility may be aware that the identifier used to connect to the web server 102 was not a fully-qualified domain name.

The remote access facility may then, in block 824, enable use of HTTP cookies on the connection by directing the web client of computing device 100 to reconnect to the web server 102 using an identifier that the web client will allow to use HTTP cookies, for example, an FQDN associated with the reverse proxy 108 and/or web server 102. This may be done in any suitable manner, including according to known HTTP redirection techniques. In some cases, when performing such a redirection, the remote access facility may store information relating to a current state of the connection, such as information that had been transmitted using an HTTP POST message. The remote access facility may then apply this information to the connection in any suitable manner, including according to techniques similar to those described above in connection with FIG. 8A. Storing such information may allow that information to still be used after the direction, and prevent disruption of a user experience during or after a redirection.

In block 826, the remote access facility may then exchange information between the web server 102 and computing device 100 over the new connection, according to any suitable technique, including any of the techniques described above. The process 800B then ends.

Techniques operating according to the principles described herein may be implemented in any suitable manner. Described above are a series of flow charts showing the steps and acts of various processes that enable private identifiers for private network resources to be used to establish connections from an outside network. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing required of a particular apparatus carrying out the types of processes described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as the Microsoft Unified Application Gateway (UAG) or Intelligent Access Gateway (IAG), available from the Microsoft Corporation of Redmond, Wash. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows operating system, available from the Microsoft Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable storage medium may be implemented as computer-readable storage media 906 or 1006 of FIGS. 9 and 10 described below (i.e., as a portion of a computing devices 900 or 1000) or as a stand-alone, separate storage medium. It should be appreciated that, as used herein, a "computer-readable medium," including "computer-readable storage medium," refers to tangible storage media having at least one physical property that may be altered in some way during a process of recording data thereon. For example, a magnetization state of a portion of a physical structure of a computer-readable medium may be altered during a recording process.

Further, some techniques described above comprise acts of storing information (e.g., data and/or instructions) in certain ways for use by the techniques. In some implementations of these techniques—such as implementations where the techniques are implemented as computer-executable instructions—the information may be encoded on a computer-readable storage media. Where specific structures are described above as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, including the exemplary computer system of FIG. 1. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
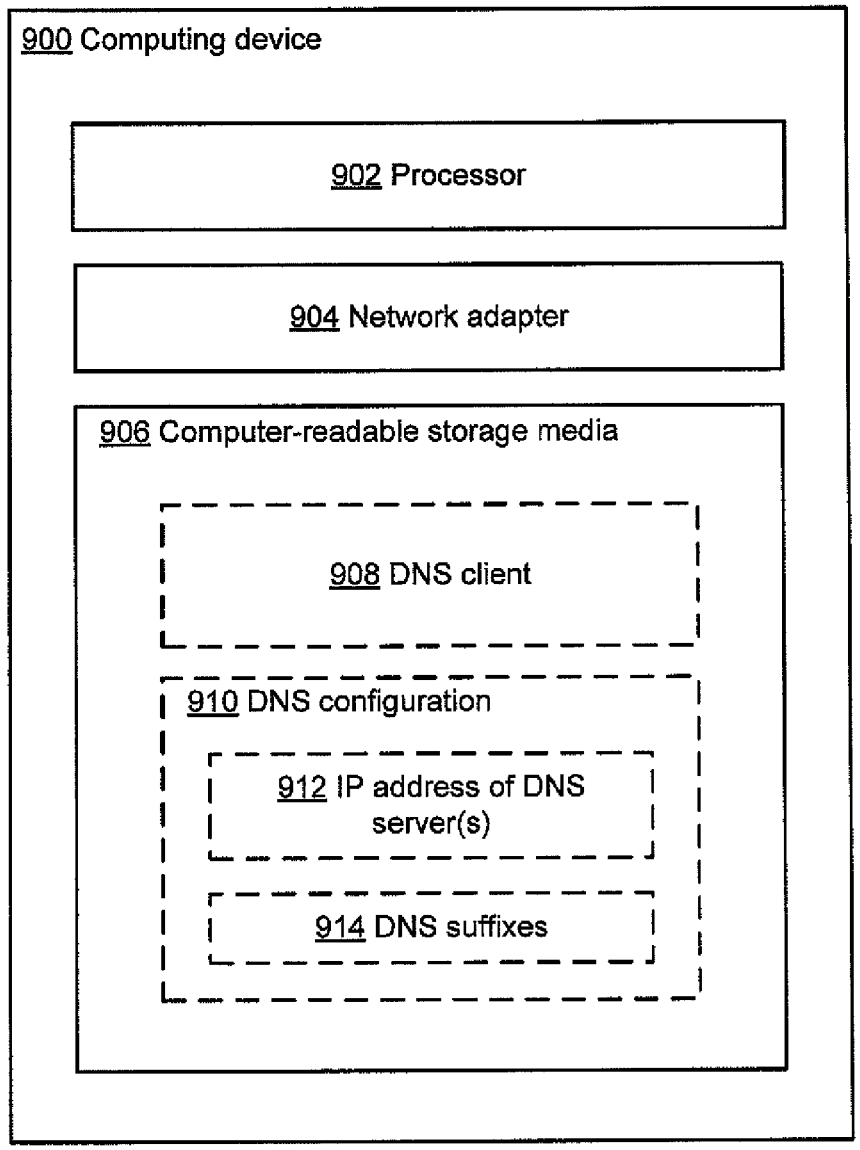
FIG. 9 is a block diagram of an exemplary computing device that may act as a client computing device in some embodiments of the invention.

FIG. 9 illustrates one exemplary implementation of a computing device in the form of a computing device 900 that may be used in a system implementing the techniques described herein, although others are possible. Computing device 900 of FIG. 9 may be implemented as a computing device 100 in some embodiments of the invention. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a personal digital assistant (PDA), a smart mobile phone, a server, a wireless access point or other networking element, or any other suitable computing device seeking remote access to a private network. Network adapter 904 may be any suitable hardware and/or software to enable the computing device 900 to communicate wirelessly with any other suitable computing device over any suitable computing network. The computing network may include a wireless access point as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG.

9, computer-readable storage media 906 stores computer-executable instructions implementing various facilities and storing various information as described above. Computer-readable storage media 906 may store a DNS client 908 to resolve private identifiers into IP addresses using any suitable technique, including techniques described above. Computer readable storage media 906 may further store DNS configuration information 910, including an IP address 912 for one or DNS servers (such as DNS server 110 and/or DNS server 112), and one or more DNS suffixes 914 to be used for forming fully-qualified domain names.

Figure 10:
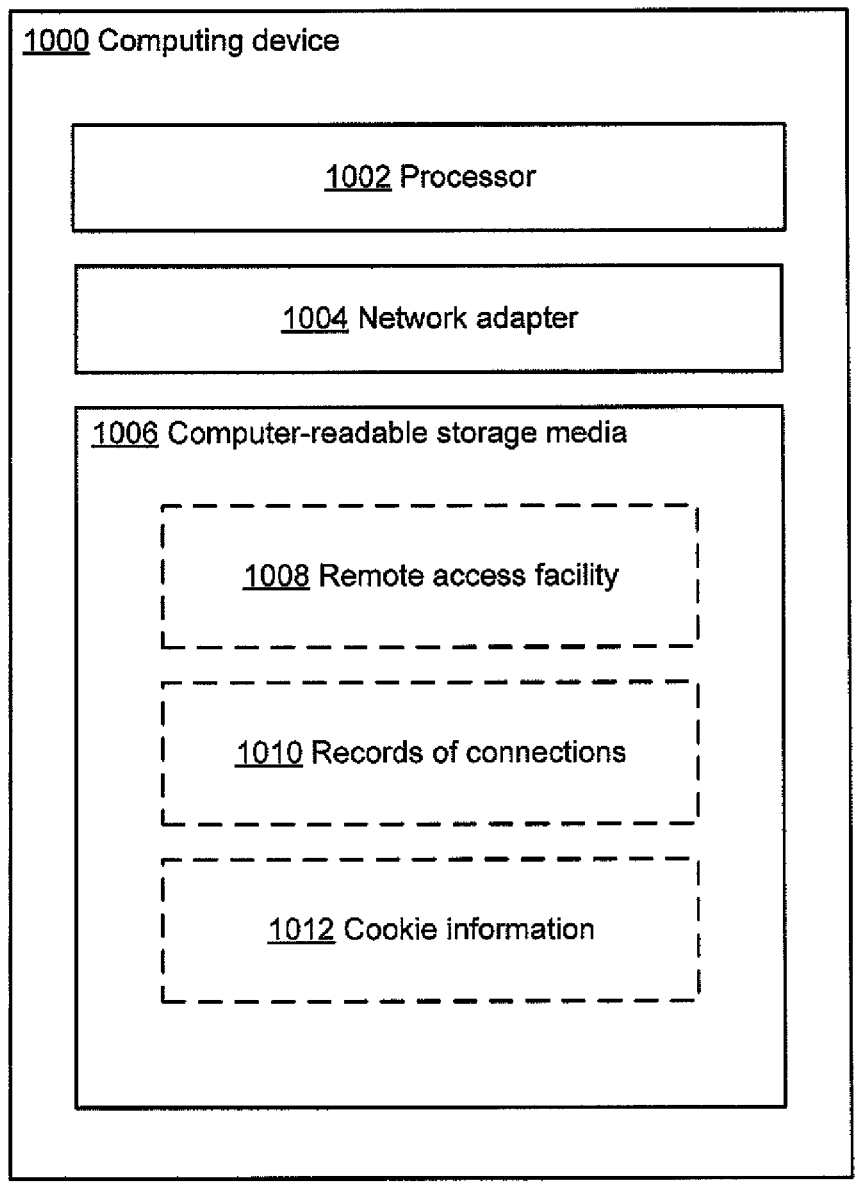
FIG. 10 is a block diagram of an exemplary computing device that may act as an edge resource of a private network in some embodiments of the invention.

FIG. 10 illustrates one exemplary implementation of a computing device in the form of a computing device 1000 that may be used in a system implementing the techniques described herein, although others are possible. Computing device 1000 of FIG. 10 may be implemented as a reverse proxy 108 in some embodiments of the invention. It should be appreciated that FIG. 10 is intended neither to be a depiction of necessary components for a computing device to operate in accordance with the principles described herein, nor a comprehensive depiction.

Computing device 1000 may comprise at least one processor 1002, a network adapter 1004, and computer-readable storage media 1006. Computing device 1000 may be, for example, a server, a mainframe, a networking device such as a firewall, gateway, or router, or any other suitable computing device. Network adapter 1004 may be any suitable hardware and/or software to enable the computing device 1000 to communicate wirelessly with any other suitable computing device over any suitable computing network. The computing network may include a wireless access point as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store a remote access facility 1008 that enables communication between a computing device connected to an outside network and a computing device connected to a private network. Computer-readable storage media 1006 may also store records 1010 relating to one or more connections that may be presented open, or may have been opened in the past, which may comprise any suitable information about the connection. HTTP information 1012 may also be stored on computer-readable media 1006, and may include information such as that which may be stored in HTTP cookies or which was exchanged using an HTTP POST transmission.

Further, while not illustrated in FIG. 10, in some embodiments of the invention the computing device 1000 may also be implemented as a DNS server, and may comprise a DNS server facility and a data store of DNS entries to resolve DNS queries received by the computing device 1000.

While not illustrated in FIGS. 9 and 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for enabling remote access to a private network resource connected to a private network from a client computer outside of the private network, wherein the private network comprises an edge resource, the method comprising:
   (A) receiving, at the edge resource of the private network, a communication from the client computer, the communication including an identifier, associated with the private network resource, that is resolvable on the private network to a first Internet Protocol (IP) address for the private network resource and that is resolvable outside of the private network to a the second IP address for the edge resource;
   (B) resolving the identifier associated with the private network resource, on the private network, to the first IP address of the private network resource, the resolving comprising providing the identifier associated with the private network to a first Domain Name System (DNS) server of the private network, and, receiving the first IP address of the private network resource from the first DNS server of the private network, the first DNS server being different from the private network resource and the edge resource;

(C) transmitting the communication to the private network resource, wherein the act (C) of transmitting the communication to the intended recipient comprises:

(C1) applying at least one security policy for the private network to determine whether the communication should be permitted to be transmitted to a private network resource that is the intended recipient of the communication; and (C2) if it is determined in act (C1) that the communication should be permitted, transmitting the communication, (D) receiving, at the edge resource, a second communication from a second client computer, the communication including a second identifier;

(E) applying the at least one security policy for the private network to determine whether the communication should be transmitted to a second private network resource that is an intended recipient of the second communication; and (F) if it is determined in act (E) that the second communication should not be permitted, not transmitting the second communication, wherein the first DNS server is connected to the private network and outside and private DNS entries are stored in a data store that is included in the first DNS server, wherein the outside and private DNS entries are used to resolve identifiers for resources connected to both the private network and the outside network;

wherein a second DNS server is connected to the outside network and outside DNS entries are stored in a data store that is included in the second DNS server; wherein the outside DNS entries are used to resolve identifiers for resources connected to the outside network.

2. The method of claim 1, further comprising:

(G) transmitting to the client computer a response from the private network resource.

3. The method of claim 2, wherein the act (G) is performed by the edge resource.

4. The method of claim 3, wherein the act (G) of transmitting the response to the client computer comprises:

(G1) receiving, at the edge resource, a response from the private network resource to the communication transmitted in the act (C); and (G2) determining that the client computer was the source of the communication.

5. The method of claim 3, wherein the identifier is a domain name according to the Domain Name System (DNS), wherein the identifier resolution request is a DNS query, and wherein the second resource of the private network is a private DNS server of the private network, and wherein the act (B) comprises:

(B1) querying the private DNS server of the private network to determine an IP address associated with the identifier.

6. The method of claim 1, further comprising:

(G) prior to the act (A) of receiving the communication, receiving at the edge resource an identifier resolution request from the client computer, the identifier resolution request containing the identifier associated with the private network resource; and (H) transmitting a response to the identifier resolution request from the edge resource to the client computer containing the second IP address for the edge resource.

7. The method of claim 1, further comprising:

(G) securing a connection between the edge resource and the client computer using an IP Security Protocol (IPsec); and wherein the communication received in act (A) is received over the connection secured in the act (G).

8. The method of claim 1, wherein the identifier is contained within a header of the communication.

9. The method of claim 1, wherein:

receiving the first IP address of the private network resource from the second resource comprises:

receiving the first IP address from the second resource prior to receiving the communication from the client computer, and storing the first IP address in a data store of IP addresses maintained by the edge resource; and resolving the identifier to the first IP address comprises retrieving the first IP address from the data store of IP addresses.

10. At least one computer-readable storage memory encoded with computer-executable instructions that, when executed by a computer, cause the computer to perform a method for enabling remote access to a private network resource connected to a private network from a client computer outside of the private network, wherein the private network comprises an edge resource, the method comprising:

(A) receiving a Domain Name System (DNS) query according to a DNS protocol from the client computer, the DNS query containing a domain name, associated with the private network resource, that is resolvable on the private network to a first Internet Protocol (IP) address for the private network resource and that is resolvable outside of the private network to a second IP address for the edge resource;

(B) transmitting a response to the DNS query from the edge resource to the client computer containing the second IP address for the edge resource;

(C) receiving, at the edge resource, a communication from the client computer, the communication including a header that contains the domain name associated with the private network resource;

(D) resolving, using the DNS protocol, the domain name to the first IP address for the private network resource, wherein the act (D) of transmitting the communication comprises:

(D1) applying at least one security policy for the private network to determine whether the communication should be permitted to be transmitted to a private network resource that is the private network resource; and (D2) if it is determined in act (D1) that the communication should be permitted, transmitting the communication to the private resource;

(E) receiving, at the edge resource, a second communication from a second client computer, the communication including a second identifier;

(F) applying the at least one security policy for the private network to determine whether the communication should be transmitted to a second private network resource that is an intended recipient of the second communication; and (G) if it is determined in act (F) that the second communication should not be permitted, not transmitting the second communication, wherein a first Domain Name System (DNS) server is connected to the private network and outside and private DNS entries are stored in a data store that is included in the first DNS server, wherein the outside and private DNS entries are used to resolve identifiers for resources connected to both the private network and the outside network;

wherein a second DNS server is connected to the outside network and outside DNS entries are stored in a data store that is included in the second DNS server; wherein the outside DNS entries are used to resolve identifiers for resources connected to the outside network.

11. The at least one computer-readable storage memory of claim 10, wherein the private network resource is a web server connected to the private network.

12. The at least one computer-readable storage memory of claim 10, wherein the communication is a communication formatted according to the HTTP protocol, and the identifier contained in the header is an HTTP identifier for a host.

13. An apparatus for use in a computer system comprising a private network having a private network resource and an edge resource accessible from outside the private network, the apparatus comprising:

at least one processor programmed to determine an intended recipient within the private network of a communication received by the edge resource from a client outside the private network by:

examining a header of the communications that contains an identifier associated with the intended recipient of the communication, the identifier being resolvable on the private network to a first Internet Protocol (IP) address for the intended recipient and resolvable outside the private network to a second IP address for the edge resource;

resolving the identifier, on the private network, to the first IP address of the intended recipient of the communication, the resolving comprising providing the identifier associated with the intended recipient to a first Domain Name System (DNS) server of the private network, and, receiving the first IP address of the intended recipient from the first DNS server of the private network, the first Domain Name System (DNS) server being different from the intended recipient and the edge resource; and transmitting the communication to the first IP address of the intended recipient, the intended recipient being the private network resource, wherein transmitting the communication to the intended recipient comprises:

applying at least one security policy for the private network to determine whether the communication should be permitted to be transmitted to a private network resource that is the intended recipient of the communication; and if it is determined that the communication should be permitted, transmitting the communication, wherein the at least one process is further programmed to:

receive, at the edge resource, a second communication from a second client, the communication including a second identifier;

apply the at least one security policy for the private network to determine whether the communication should be transmitted to a second private network resource that is an intended recipient of the second communication; and if it is determined that the second communication should not be permitted, not transmitting the second communication, wherein the first DNS server is connected to the private network and outside and private DNS entries are stored in a data store that is included in the first DNS server, wherein the outside and private DNS entries are used to resolve identifiers for resources connected to both the private network and the outside network;

wherein a second DNS server is connected to the outside network and outside DNS entries are stored in a data store that is included in the second DNS server; wherein the outside DNS entries are used to resolve identifiers for resources connected to the outside network.

14. The apparatus of claim 13, wherein the at least one processor is further adapted to transmit to the client computer a response from the private network resource, and wherein transmitting the response comprises:

receiving, at the apparatus, a response from the private network resource to the communication transmitted; and determining that the client computer was the source of the communication.

15. The apparatus of claim 13, wherein the apparatus is a reverse proxy server.

* * * * *